(12) United States Patent
Yamada et al.

(10) Patent No.: US 7,795,955 B2
(45) Date of Patent: Sep. 14, 2010

(54) SEMICONDUCTOR INTEGRATED CIRCUIT AND POWER CONTROL METHOD

(75) Inventors: Yutaka Yamada, Kanagawa (JP); Tatsunori Kanai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 74 days.

(21) Appl. No.: 12/361,964

(22) Filed: Jan. 29, 2009

(65) Prior Publication Data

US 2009/0189686 A1    Jul. 30, 2009

(30) Foreign Application Priority Data

Jan. 30, 2008    (JP) ............................... 2008-19051

(51) Int. Cl.
*G05F 1/10* (2006.01)
(52) U.S. Cl. ...................... 327/544; 327/530
(58) Field of Classification Search ................ 327/530, 327/534, 537, 544

See application file for complete search history.

(56) References Cited

U.S. PATENT DOCUMENTS 5,724,297 A * 3/1998 Noda et al. ................. 365/226
6,535,056 B2 * 3/2003 Mizuno ...................... 327/544

FOREIGN PATENT DOCUMENTS

JP    2006-237189    9/2006

OTHER PUBLICATIONS

Benini, et al., "Networks on Chips: A New SoC Paradigm", IEEE Computer, SOC Designs, pp. 70-78, (Jan. 2002).

* cited by examiner

*Primary Examiner*—Jeffrey S Zweizig
(74) *Attorney, Agent, or Firm*—Finnegan, Henderson, Farabow, Garrett & Dunner, L.L.P.

(57) ABSTRACT

Each of computing units on a semiconductor integrated circuit includes a first signal output unit that outputs a first status signal indicating a state of a input/output control unit with regard to an access to a storage unit, a second signal output unit that outputs a second status signal indicating a state of a process control unit with regard to an access to a processing unit, and a power control unit that control ON and OFF of power of the storage unit and the processing unit based on states of the first status signal and the second status signal.

12 Claims, 12 Drawing Sheets

FIG.3
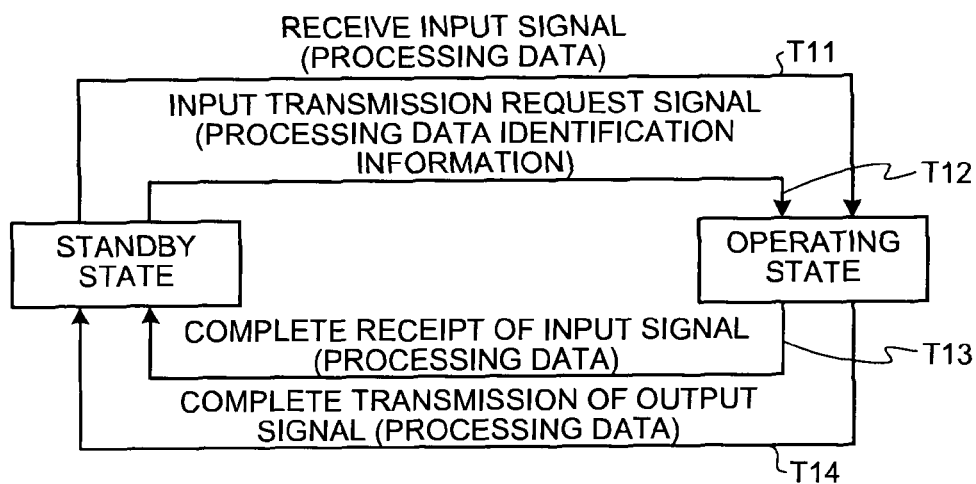
FIG.4
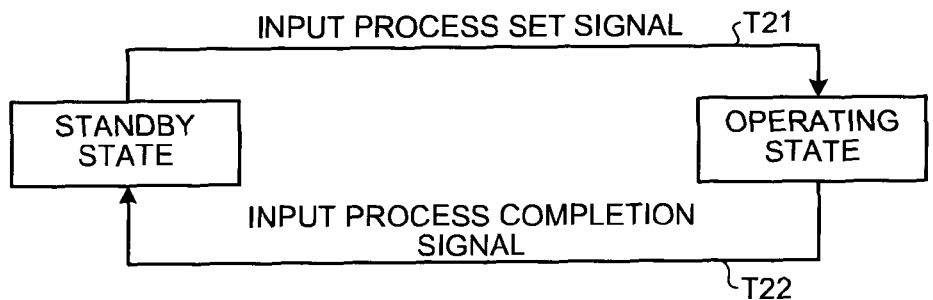
FIG.5
| PROCESS STATUS SIGNAL | INPUT/OUTPUT STATUS SIGNAL | POWER OF PROCESSING UNIT | POWER OF STORAGE UNIT |
|---|---|---|---|
| OPERATING STATE | OPERATING STATE | ON | ON |
| OPERATING STATE | STANDBY STATE | ON | ON |
| STANDBY STATE | OPERATING STATE | OFF | ON |
| STANDBY STATE | STANDBY STATE | OFF | OFF |

SEMICONDUCTOR INTEGRATED CIRCUIT AND POWER CONTROL METHOD

CROSS-REFERENCE TO RELATED APPLICATIONS

This application is based upon and claims the benefit of priority from the prior Japanese Patent Application No. 2008-19051, filed on Jan. 30, 2008; the entire contents of which are incorporated herein by reference.

BACKGROUND OF THE INVENTION

1. Field of the Invention

The present invention relates to a technology for power control on a semiconductor integrated circuit including a plurality of computing units.

2. Description of the Related Art

With high integration of semiconductor integrated circuits in recent years, the number of IP cores (computing units) to be mounted on a single semiconductor integrated circuit is increasing, and structures and control methods for those IP cores are becoming more complex and diversified. Furthermore, more and more IP cores may be mounted on a system-on-chip (a system LSI) in the future. Therefore, the demand for effective power management of a plurality of IP cores is growing.

Due to the above situation, "Geovanni D Micilli, Luca Benini, "Networks on Chips: a new SoC paradigm" IEEE Computer, January 2002, Pages: 70 to 78" discloses a technology for performing asynchronous communication using a communication protocol shared by IP cores mounted on a system LSI to simplify control on the IP cores and improve reusability of the IP cores. Furthermore, JP-A 2006-237189 (KOKAI) discloses a technology for providing a power control circuit that performs power control on each of IP cores individually, so that power of an IP core that has transmitted an interrupt signal indicating process completion notification can be individually turned off.

However, the technology disclosed in the literature by Geovanni et al. includes only a method for simplifying a structure by enabling each IP core on a system LSI to operate independent of other IP cores, and does not include any methods for reducing power consumption. Therefore, it is difficult to effectively perform power management of IP cores. Furthermore, in the technology disclosed in JP-A 2006-237189 (KOKAI), all IP cores are integrally managed. Therefore, if load on the power control circuit increases due to increase of the number of the IP cores, it takes longer time to perform power control. Thus, power control may not be effectively performed.

SUMMARY OF THE INVENTION

According to one aspect of the present invention, a semiconductor integrated circuit includes a plurality of computing units, wherein each of the computing units includes an input/output control unit that controls input and output of a process set signal, the process set signal being sent to and from the other computing units and indicating processing data and processing content of the processing data; a storage unit that stores the processing data and processing content of the processing data; a first signal output unit that outputs a first status signal indicating either one of an operating state and a standby state, the operating state indicating a state of the input/output control unit being to access the storage unit, and the standby state indicating a state of the input/output control unit being in other than the operating state; a processing unit that performs a predetermined process, that the process set signal indicates, on processing data stored in the storage unit, stores the processing data that has been processed in the storage unit, and outputs identification information for identifying the processing data that has been processed from the storage unit and the process set signal indicating processing content to be performed by the other computing units; a process control unit that controls a process performed by the processing unit based on the process set signal; a second signal output unit that outputs a second status signal indicating either one of an operating state and a standby state, the operating state indicating a state of the process control unit being to control the processing unit, and the standby state indicating a state of the control unit being in other than the operating state; and a power control unit that controls ON and OFF of power of the storage unit and the processing unit based on states of the first status signal and the second status signal.

According to another aspect of the present invention, a power control method implemented in each of computing units in a semiconductor integrated circuit that provides a plurality of computing units, the method includes controlling input and output of a process set signal, the process set signal being sent to and from the other computing units and indicating processing data and processing content of the processing data, by an input/output control unit; storing processing data and processing content of the processing data in a storage unit; first outputting a first status signal indicating either one of an operating state and a standby state by a first signal output unit, the operating state indicating a state of the input/output control unit being to access the storage unit, and the standby state indicating a state of the input/output control unit being in other than the operating state; performing a predetermined process, that the process set signal indicates, on processing data stored in the storage unit by a processing unit, storing the processing data that has been processed in the storage unit, and outputting identification information for identifying the processing data that has been processed from the storage unit and the process set signal indicating processing content to be performed by the other computing units; controlling a process performed by the processing unit based on the process set signal; second outputting a second status signal indicating either one of an operating state and a standby state by a second signal output unit, the operating state indicating a state of the process control unit being to control the processing unit, and the standby state indicating a state of the control unit being in other than the operating state; and controlling ON and OFF of power of the storage unit and the processing unit by a power control unit based on states of the first status signal and the second status signal.

BRIEF DESCRIPTION OF THE DRAWINGS

FIG. 3 is a diagram for explaining state transition of an input/output control unit shown in FIG. 2;

FIG. 4 is a diagram for explaining state transition of a process control unit shown in FIG. 2;

FIG. 5 is a diagram illustrating a pattern of power control performed by a power control unit shown in FIG. 2;

DETAILED DESCRIPTION OF THE INVENTION

Exemplary embodiments of a semiconductor integrated circuit and a power control method according to the present invention are explained in detail below with reference to the accompanying drawings. In the description of the exemplary embodiments below, examples will be used in which the present invention is applied to a system LSI. However, the configurations to which the present invention can be applied are not limited to these examples.

Figure 1:
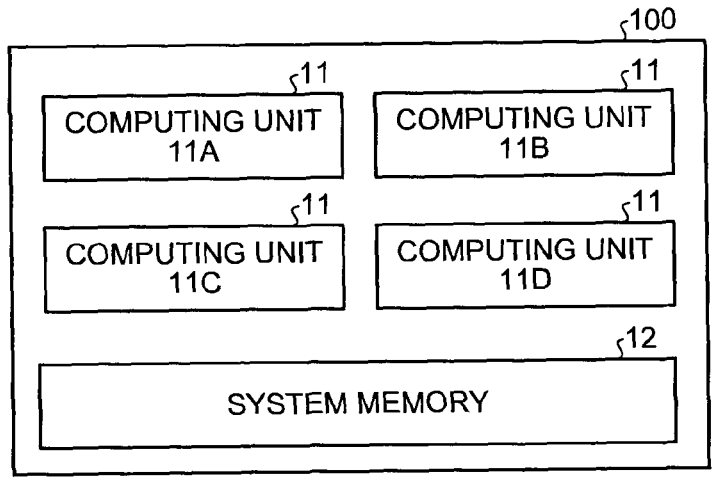
FIG. 1 is a diagram of a system LSI according to a first embodiment of the present invention.

FIG. 1 is a block diagram of a system LSI 100 according to a first embodiment of the present invention. As shown in FIG. 1, the system LSI 100 includes computing units 11 and a system memory 12. These constituent elements are connected to one another via a communication device (not shown).

Each of the computing units 11 includes a processing unit 111 such as a processor as will be described later, performs a process indicated by a process set signal on data input from outside as will be described later, and outputs processed data (hereinafter, "processing data") to outside. Here, each of the four computing units 11 (computing units 11A to 11D) starts data processing in each unit in conjunction with processing data input from the other ones of the computing units 11 so that a series of data processing is sequentially executed.

Specifically, when the computing unit 11A sends processing data that has been processed by the computing unit 11A and a process set signal indicating a next process to be performed on the processing data to the computing unit 11B in the next stage, the computing unit 11B performs the process indicated by the process set signal on the processing data sent from the computing unit 11A and then sends the processing data that has been processed and a process set signal indicating a next process to be performed on the processing data to the computing unit 11C in the next stage. Similarly, the computing unit 11C performs the process indicated by the process set signal on the processing data input from the computing unit 11B and then outputs the processing data that has been processed and a process set signal indicating a next process to be performed on the processing data to the computing unit 11D in the next stage. Thus, each of the computing units 11 outputs processing data that has been processed by each unit to the computing unit 11 in the next stage to sequentially execute a series of processing.

The system memory 12 is shared by all the computing units 11 and stores therein computer programs, parameters, and the like used for processes performed by the computing units 11. The communication device (not shown) is required to at least transmit an input signal to be input to the computing units 11 and an output signal to be output from the computing units 11. For example, devices such as an on-chip bus, a synchronous network, or an asynchronous network can be employed as the communication device (not shown).

In the configuration shown in FIG. 1, the four computing units 11 are provided. However, the configuration is not limited to the above and the number of the computing units 11 can be at least two. Furthermore, FIG. 1 depicts an example in which the computing units 11 are arranged in a grid. However, the example is not limited to the above and the computing units 11 can be arranged at arbitrary positions. Moreover, in the configuration shown in FIG. 1, the system memory 12 is provided as a system memory of the system LSI 100. However, a system memory can be removed from the configuration or two or more of system memories can be included in the configuration.

Figure 2:
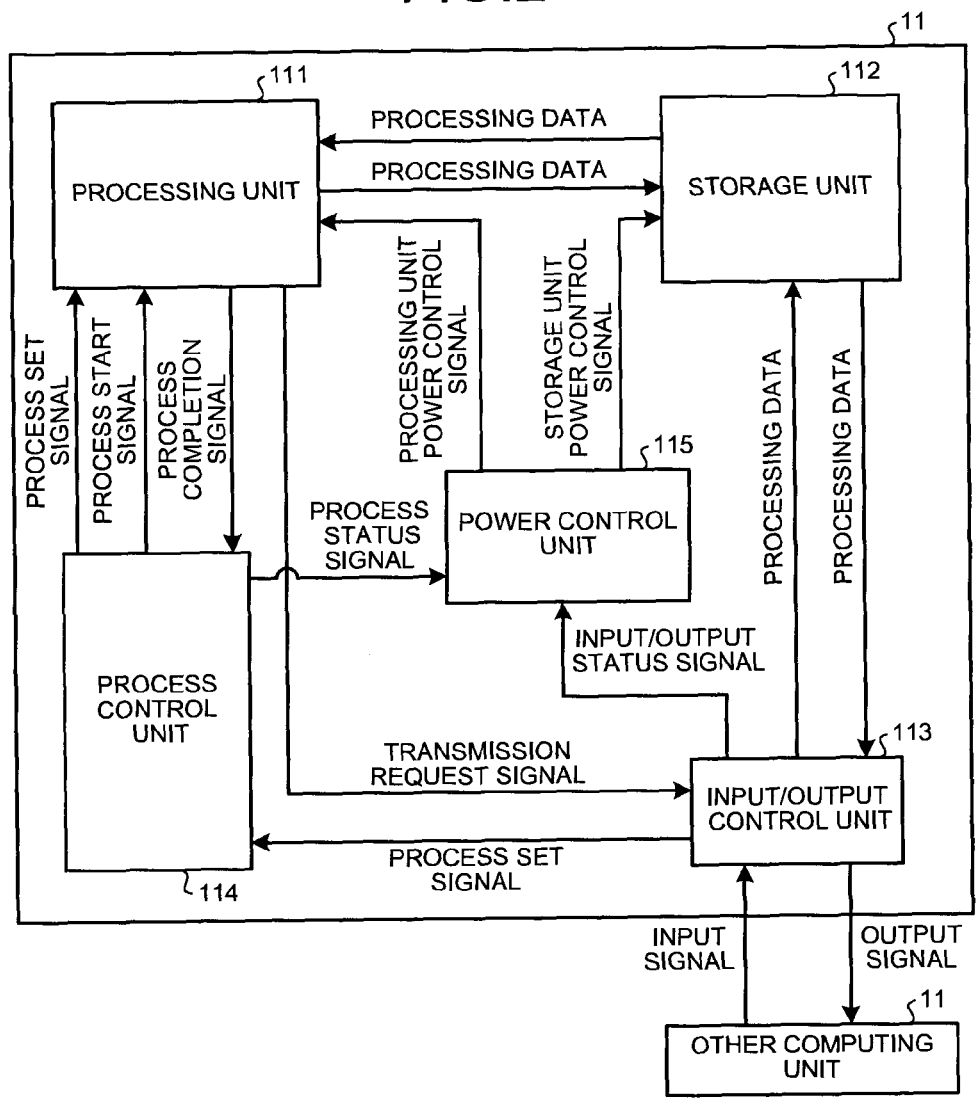
FIG. 2 is a diagram of a computing unit shown in FIG. 1.

Next, a configuration of the computing unit 11 is described with reference to FIG. 2. FIG. 2 is a block diagram of the computing unit 11. As shown in FIG. 2, the computing unit 11 includes the processing unit 111, a storage unit 112, an input/output control unit 113, a process control unit 114, and a power control unit 115.

The processing unit 111 is a processor, a DSP (Digital Signal Processor), an FPGA (Field Programmable Gate Array), a reconfigurable processor, a hardware engine, or the like, and performs a predetermined process under control of the process control unit 114. The configuration of the processing unit 111 can be the same for each of the computing units 11 (the computing units 11A to 11D), or can be different for each of the computing units 11.

Specifically, when the process control unit 114 performs setting of a process to be performed next by the processing unit 111, the processing unit 111 waits until a process start signal input from the process control unit 114 is activated (asserted). When the input process start signal is asserted, the processing unit 111 starts the process corresponding to the setting. At this state, data to be processed (processing data) is stored in the storage unit 112 due to control by the input/output control unit 113 as will be described later. Therefore, the processing unit 111 acquires processing data to be processed from the storage unit 112 by outputting a read request signal for the processing data to be processed to the storage unit 112.

Furthermore, the processing unit 111 outputs a write request signal for the processing data that has been processed to the storage unit 112 to store the processing data in the storage unit 112 and then outputs a transmission request signal containing information for identifying the processing data (processing data identification information) to the input/output control unit 113. Here, the "processing data identification information" indicates information, such as a pointer indicating a memory address for processing data or a transfer size, by which processing data can be identified from the storage unit 112. If processing data is not to be sent to the other ones of the computing units 11, a process of outputting the processing data identification information can be omitted.

Furthermore, the processing unit 111 outputs, as the transmission request signal, information for specifying a process to be performed by the computing unit 11 in the next stage (a process set signal) to the input/output control unit 113. If the computing unit 11 does not control a process to be performed by the other ones of the computing units 11, a process of outputting the process set signal can be omitted.

The "process set signal" is information for specifying processing content to be performed on the processing data and contains data corresponding to characteristics of the processing unit 111. For example, if the processing unit 111 is a processor or a DSP, it is preferable to use, as the process set signal, a pointer indicating a memory address on the system memory 12 in which a computer program for executing the specified process is stored or a binary code itself of the computer program.

Furthermore, if the processing unit 111 is an FPGA or a reconfigurable processor, it is preferable to use, as the process set signal, a pointer indicating a memory address on the system memory 12 in which configuration information for configuring a logic circuit that executes the specified process is stored or a binary code itself of the configuration information. Moreover, if the processing unit 111 is a hardware engine, it is preferable to use, as the process set signal, a pointer indicating a memory address on the system memory 12 in which a control parameter for executing the specified process is stored or the control parameter itself.

Upon completion of storing the processing data in the storage unit 112 and sending the transmission request signal to the input/output control unit 113 as described above, the processing unit 111 outputs a process completion signal indicating completion of the process to the process control unit 114. A process to be performed by the computing unit 11 in the next stage can be determined depending on a processing result from the processing unit 111 or can be provided in advance in computer programs to be executed by the processing unit 111.

Furthermore, the processing unit 111 turns on and off its own power according to a state of a processing unit power control signal input from the power control unit 115. Here, power-off means a state in which power supply is completely stopped and a state in which power supply is reduced (sleep state). In the former state, because the processing unit 111 cannot detect the processing unit power control signal, the power control unit 115 starts power supply to the processing unit 111.

The storage unit 112 is used as a local memory of the computing unit 11, and performs storing and reading of processing data according to a read request signal and a write request signal input from the processing unit 111 and the input/output control unit 113.

Specifically, upon receipt of the write request signal for processing data from the processing unit 111 or the input/output control unit 113, the storage unit 112 stores therein the processing data indicated by the write request signal. Furthermore, upon receipt of the read request signal for processing data from the processing unit 111 or the input/output control unit 113, the storage unit 112 reads the processing data from a memory address indicated by the read request signal and outputs the processing data to a source device.

Moreover, the storage unit 112 turns on and off its own power according to a state of a storage unit power control signal input from the power control unit 115. Similar to the above, power-off means a state in which power supply is completely stopped and a state in which power supply is reduced (sleep state).

The input/output control unit 113 is an interface for performing communication with the communication device (not shown) mounted on the system LSI 100 and controls input and output of signals sent to and from the other ones of the computing units 11 via the communication device.

Specifically, the input/output control unit 113 receives a signal (input signal) sent to the computing unit 11 of own unit from the other ones of the computing units 11. Then, if the input signal contains the process set signal, the input/output control unit 113 outputs the process set signal to the process control unit 114. As described above, if a pointer indicating a memory address on the system memory 12 is indicated as the process set signal, the input/output control unit 113 acquires target data from the pointer indicating the memory address and outputs acquired data as the process set signal to the process control unit 114.

Furthermore, if the input signal contains processing data, the input/output control unit 113 outputs a write request signal for the processing data to the storage unit 112 to store the processing data in the storage unit 112.

Moreover, upon receipt of the transmission request signal from the processing unit 111, the input/output control unit 113 adds identification information of the computing unit 11 serving as a destination (the computing unit 11 in the next stage) to the transmission request signal, and sends the transmission request signal as an output signal to the computing unit 11 serving as the destination.

If the transmission request signal contains the processing data identification information, the input/output control unit 113 acquires processing data from the storage unit 112 based on a pointer indicating a memory address for the processing data or a transfer size indicated by the information, and sends the processing data as an output signal to the other ones of the computing units 11.

For example, if a pointer indicating a memory address specified by the processing data identification information is "0x4000" and a transfer size is "32-byte", the input/output control unit 113 outputs to the storage unit 112 a read request signal for requesting read of 32 bytes of data from the memory address "0x4000", and acquires, as processing data, data input from the storage unit 112.

Furthermore, the input/output control unit 113 outputs an input/output status signal indicating a state of own unit with regard to reception and transmission of the input signal and the output signal to the power control unit 115. State transition of the input/output control unit 113 is described below with reference to FIG. 3.

FIG. 3 is a schematic diagram illustrating state transition of the input/output control unit 113. It is assumed that an input/output status signal to be output when the input/output control unit 113 is in an initial state, that is, when an input signal and an output signal are not received and transmitted, indicates "standby". Hereinafter, a state of the input/output status signal whose value indicating "standby" is refereed to as a standby state and a state of the input/output status signal whose value indicating "operating" is refereed to as an operating state.

As shown in FIG. 3, upon receiving an input signal containing processing data from the other ones of the computing units 11 while the input/output status signal is in the standby state, the input/output control unit 113 changes the state of the input/output status signal from the standby state to the operating state (T11 in FIG. 3). Similarly, upon receiving input of a transmission request signal containing the processing data identification information from the processing unit 111 while the input/output status signal is in the standby state, the input/output control unit 113 changes the state of the input/output status signal from the standby state to the operating state (T12 in FIG. 3). That is, when required to write the processing data to the storage unit 112, i.e., to output the write request signal to the storage unit 112, by receiving the input signal containing the processing data from the other ones of the computing units 11, the input/output control unit 113 changes the state of the input/output status signal to the operating state. Furthermore, when required to read the processing data from the storage unit 112, i.e., to output the read request signal to the storage unit 112, by receiving the transmission request signal containing the processing data identification information from the processing unit 111, the input/output control unit 113 changes the state of the input/output status signal to the operating state.

Moreover, upon writing processing data to the storage unit 112 while the input/output status signal is in the operating state and determining that receipt of a series of input signals (processing data) sent from the other ones of the computing units 11 is completed, the input/output control unit 113 changes the state of the input/output status signal from the operating state to the standby state (T13 in FIG. 3). Similarly, upon acquiring processing data from the storage unit 112 based on the transmission request signal (the processing data identification information) while the input/output status signal is in the operating state and completing transmission of an output signal generated from the processing data to the other ones of the computing units 11, the input/output control unit 113 changes the state of the input/output status signal from the operating state to the standby state (T14 in FIG. 14). That is, the input/output control unit 113 changes the state of the input/output status signal to the standby state when access to the storage unit 112 caused by receipt of the input signal or the transmission request signal is completed. Thus, the operating state of the input/output status signal indicates that the input/output control unit 113 is in a state for accessing the storage unit 112 for the processing data. Furthermore, the standby state of the input/output status signal indicates that the input/output control unit 113 is in a state other than the above operating state.

Referring back to FIG. 2, the process control unit 114 controls operation of the processing unit 111 based on an external process set signal input from the input/output control unit 113. Specifically, the process control unit 114 sets data (binary data) or a parameter contained in the process set signal to the processing unit 111 to cause the processing unit 111 to perform a process indicated by the process set signal.

Furthermore, after performing setting according to the process set signal, the process control unit 114 outputs a process start signal indicating a start of a process to the processing unit 111 to cause the processing unit 111 to start the processing. If the process set signal is input from the input/output control unit 113 while the processing unit 111 is operating, the process control unit 114 delays reception of the process set signal until a process completion signal is input from the processing unit 111.

Moreover, the process control unit 114 outputs a process status signal indicating the state of own unit with regard to control on the processing unit 111 to the power control unit 115. State transition of the process control unit 114 is described below with reference to FIG. 4.

FIG. 4 is a schematic diagram illustrating state transition of the process control unit 114. It is assumed that a process status signal to be output when the process control unit 114 is in an initial state, that is, when a process set signal and a process completion signal are not input, indicates "standby". Hereinafter, a state of the process status signal indicating "standby" is refereed to as a standby state and a state of the process status signal indicating "operating" is refereed to as an operating state.

As shown in FIG. 4, upon receiving input of the process set signal from the input/output control unit 113 while the process status signal is in the standby state, the process control unit 114 changes the state of the process status signal from the standby state to the operating state (T21 in FIG. 4). That is, when required to control the processing unit 111 because of receipt of the process set signal output from the input/output control unit 113, the process control unit 114 changes the state of the process status signal to the operating state.

Furthermore, upon receiving input of the process completion signal from the processing unit 111 while the process status signal is in the operating state, the process control unit 114 changes the state of the process status signal from the operating state to the standby state (T22 in FIG. 4). That is, the process control unit 114 controls operation of the processing unit 111 while the process status signal is in the operating state, and when receiving the process completion signal indicating completion of the process from the processing unit 111, the process control unit 114 changes the state of the process status signal to the standby state. Thus, the operating state of the process status signal indicates that the process control unit 114 is in a state for controlling the processing unit 111. Furthermore, the standby state of the process status signal indicates that the process control unit 114 is in a state other than the above operating state.

Referring back to FIG. 2, the power control unit 115 controls ON and OFF of the power of the processing unit 111 by outputting the processing unit power control signal for controlling the power of the processing unit 111 according to the state of the input/output status signal input from the input/output control unit 113 and the state of the process status signal input from the process control unit 114. Furthermore, the power control unit 115 controls ON and OFF of the power of the storage unit 112 by outputting the storage unit power control signal for controlling the power of the storage unit 112 according to the state of the input/output status signal input from the input/output control unit 113 and the state of the process status signal input from the process control unit 114.

FIG. 5 is a diagram illustrating a pattern of power control performed by the power control unit 115. As shown in FIG. 5, the power control unit 115 controls ON and OFF of the power of the processing unit 111 and the storage unit 112 based on correspondences between the state of the input/output status signal and the state of the process status signal. For example, when both the process status signal and the input/output status signal are in the operating states, the power control unit 115 outputs the processing unit power control signal indicating power-on to the processing unit 111 and the storage unit power control signal indicating power-on to the storage unit 112. Furthermore, when the process status signal is in the operating state and the input/output status signal is in the standby state, the power control unit 115 outputs the processing unit power control signal indicating power-on to the processing unit 111 and the storage unit power control signal indicating power-on to the storage unit 112.

Moreover, when the process status signal is in the standby state and the input/output status signal is in the operating state, the power control unit 115 outputs the processing unit power control signal indicating power-off to the processing unit 111 and the storage unit power control signal indicating power-on to the storage unit 112. Furthermore, when both the process status signal and the input/output status signal are in the standby states, the power control unit 115 outputs the processing unit power control signal indicating power-off to the processing unit 111 and the storage unit power control signal indicating power-off to the storage unit 112.

As described above, ON and OFF of the power of the processing unit 111 and the storage unit 112 are controlled depending on the states of the input/output status signal and the process status signal. Therefore, the power of the storage unit 112 can be turned on when the input/output control unit 113 needs to access the storage unit 112, and the power of the storage unit 112 can be turned off when the input/output control unit 113 finishes access to the storage unit 112. Similarly, the power of the processing unit 111 can be turned on when the process control unit 114 needs to control the processing unit 111, and the power of the processing unit 111 can be turned off when the process control unit 114 finishes control on the processing unit 111, that is, finishes processing on the processing unit 111.

It is possible to set a predetermined wait time before switching a power-on state to a power-off state, so that when the wait time expires, a power control signal indicating power-off is output to each unit. With this configuration, a process can be continuously performed on the processing data and the process set signal that are sequentially input and output, without turning off the power of the storage unit 112. As a result, processes can be efficiently performed. Here, the wait time can be arbitrary set.

An operation performed by the computing unit 11 according to the first embodiment is described below. First, an operation performed when an input signal is input from the other ones of the computing units 11 (an input signal reception process) is described with reference to FIG. 6.

Figure 6:
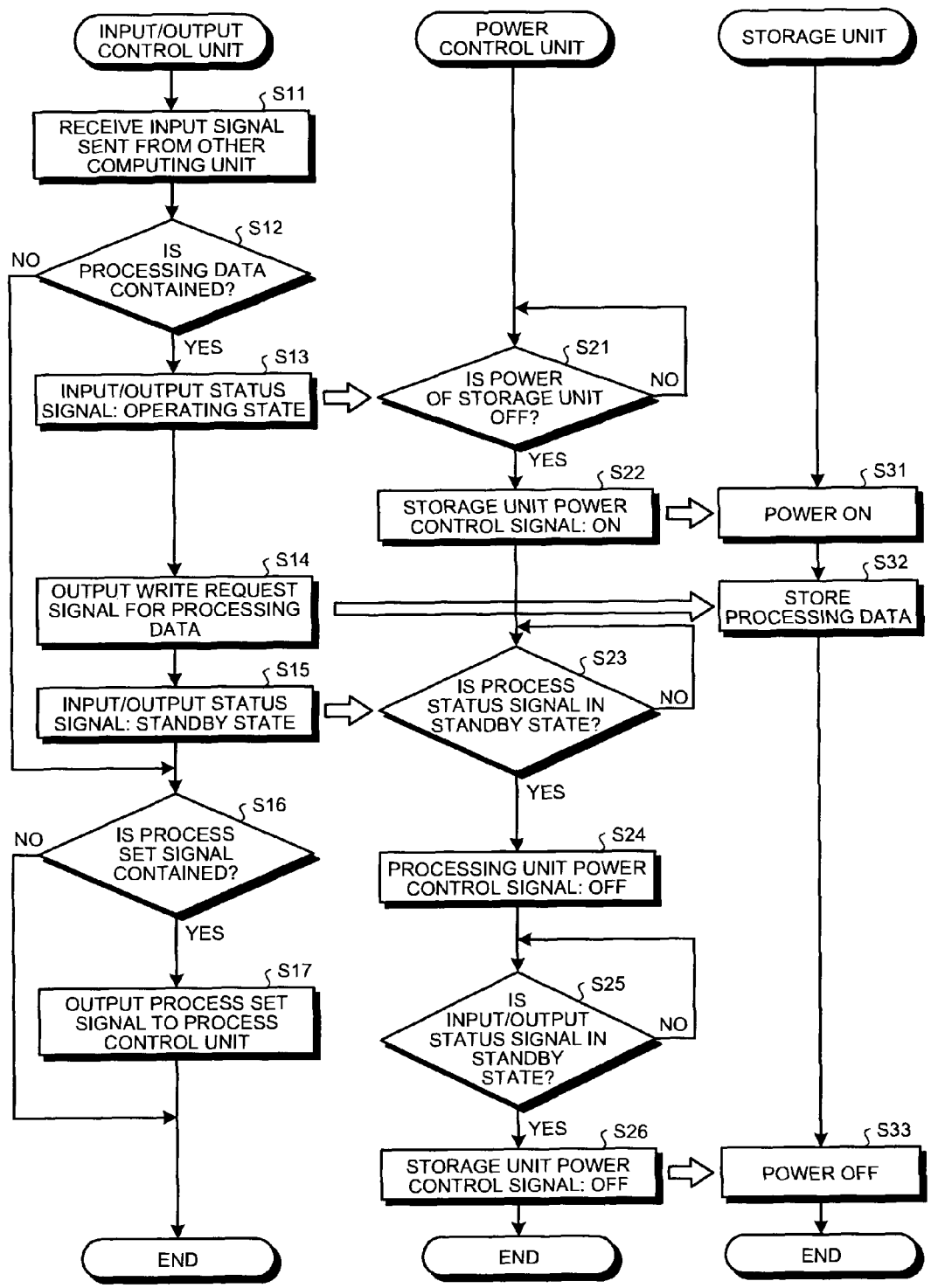
FIG. 6 is a flowchart of a procedure of an input signal reception process according to the first embodiment.

FIG. 6 is a flowchart of a procedure of the input signal reception process. In FIG. 6, Steps S11 to S17 are processes performed by the input/output control unit 113, Steps S21 to S26 are processes performed by the power control unit 115, and Steps S31 to S33 are processes performed by the storage unit 112.

The input/output control unit 113 receives an output signal sent from the other ones of the computing units 11 as an input signal to the computing unit 11 of own unit (Step S11), and determines whether the input signal contains processing data (Step S12). When it is determined that the input signal does not contain the processing data (Step S12: No), process control directly proceeds to Step S16.

When it is determined at Step S12 that the input signal contains the processing data (Step S12: Yes), the input/output control unit 113 changes the state of the input/output status signal to the operating state (Step S13).

Meanwhile, upon detecting that the state of the input/output status signal is changed to the operating state, the power control unit 115 determines whether the power of the storage unit 112 is OFF by checking the state of the storage unit power control signal output from the power control unit 115 itself (Step S21). When it is determined that the power of the storage unit 112 is ON (Step S21: No), the current state of the storage unit power control signal is maintained.

On the other hand, when it is determined at Step S21 that the power of the storage unit 112 is OFF (Step S21: Yes), the power control unit 115 outputs the storage unit power control signal indicating power-on to the storage unit 112 (Step S22). As a result, the storage unit 112 is turned on (Step S31).

Meanwhile, after Step S13, the input/output control unit 113 outputs a write request signal for the processing data contained in the input signal to the storage unit 112 (Step S14). The storage unit 112 stores therein the processing data according to the write request signal (Step S32). Then, upon completing writing of the processing data to the storage unit 112, the input/output control unit 113 changes the state of the input/output status signal to the standby state (Step S15), and process control proceeds to Step S16.

At Step S16, the input/output control unit 113 determines whether a process set signal is contained in the input signal received at Step S11. When it is determined that the process set signal is not contained in the input signal (Step S16: No), process control by the input/output control unit 113 ends. On the other hand, at Step S16, when it is determined that the process set signal is contained in the input signal (Step S16: Yes), the input/output control unit 113 outputs the process set signal to the process control unit 114 (Step S17), and then process control by the input/output control unit 113 ends.

Meanwhile, the power control unit 115 monitors the state of the process status signal input from the process control unit 114 (not shown) (Step S23: No). When detecting that the process status signal is in the standby state (Step S23: Yes), the power control unit 115 outputs the processing unit power control signal indicating power-off to the processing unit 111 (Step S24). As a result, the processing unit 111 is turned off.

Then, the power control unit 115 monitors the state of the input/output status signal input from the input/output control unit 113 (Step S25: No). When detecting that the input/output status signal is in the standby state (Step S25: Yes), the power control unit 115 outputs the storage unit power control signal indicating power-off the storage unit 112 (Step S26). As a result, the storage unit 112 is turned off (Step S33), and process control ends.

In the input signal reception process shown in FIG. 6, whether the processing data is contained in the input signal is determined and thereafter whether the process set signal is contained in the input signal is determined. However, an order of the processes is not limited to the above and can be changed with each other or the processes can be performed in parallel to each other. Furthermore, timings at which processes at Steps S23 to S26 are performed are not limited to those described in the example shown in FIG. 6 and can be arbitrary.

Figure 7:
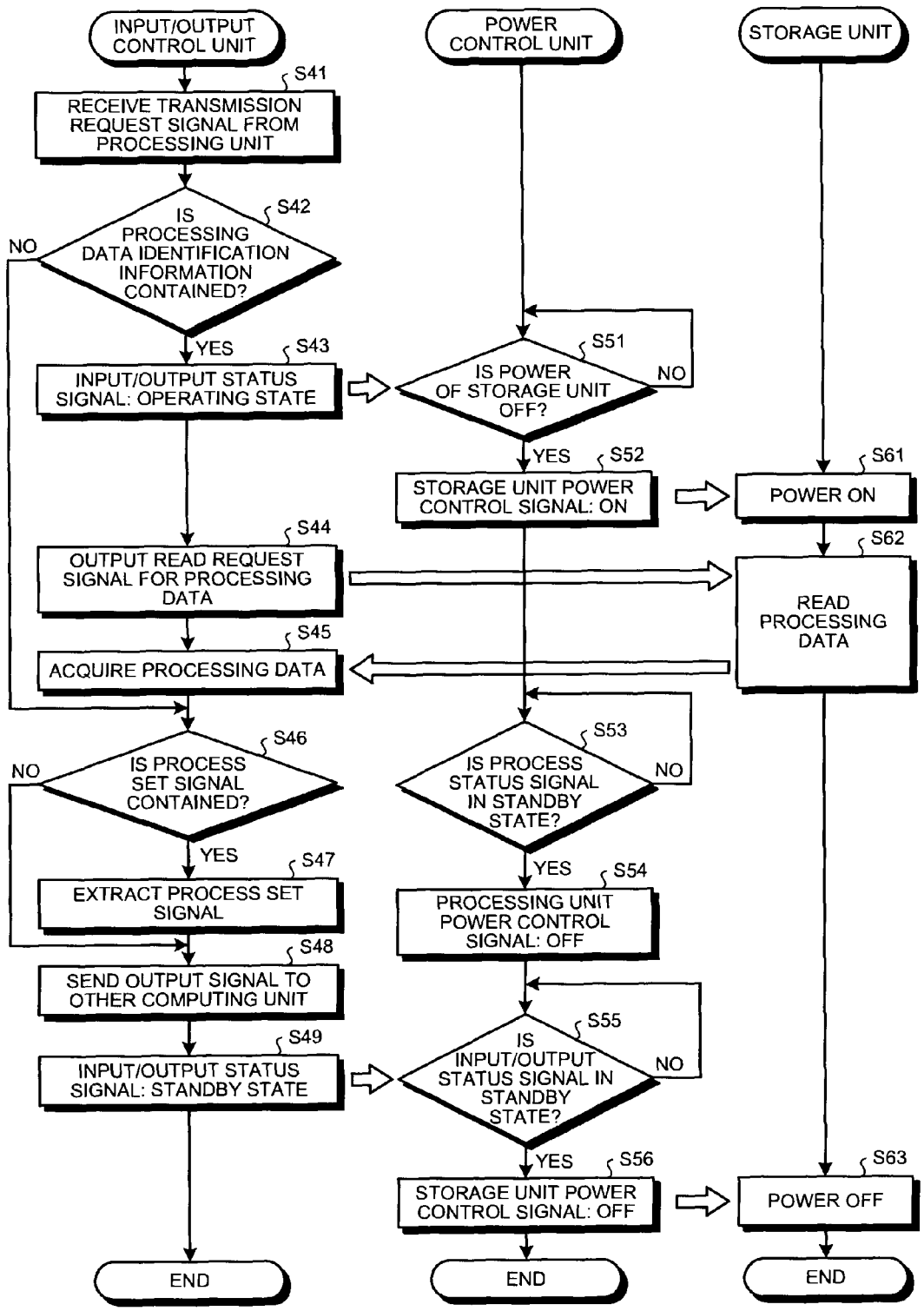
FIG. 7 is a flowchart of a procedure of an output signal transmission process according to the first embodiment.

Next, an operation performed when an output signal is transmitted to the other ones of the computing units 11 (an output signal transmission process) is described with reference to FIG. 7. In FIG. 7, Steps S41 to S49 are processes performed by the input/output control unit 113, Steps S51 to S56 are processes performed by the power control unit 115, and Steps S61 to S63 are processes performed by the storage unit 112.

The input/output control unit 113 receives input of a transmission request signal from the processing unit 111 (Step S41), and determines whether the transmission request signal contains processing data identification information (Step S42). When it is determined that the transmission request signal does not contain the processing data identification information (Step S42: No), process control directly proceeds to Step S46.

When it is determined at Step S42 that the transmission request signal contains the processing data identification information (Step S42: Yes), the input/output control unit 113 changes the state of the input/output status signal to the operating state (Step S43).

Meanwhile, upon detecting that the state of the input/output status signal is changed to the operating state, the power control unit 115 determines whether the power of the storage unit 112 is OFF by checking the state of the storage unit power control signal output from the power control unit 115 itself (Step S51). When it is determined that the power of the storage unit 112 is ON (Step S51: No), the current state of the storage unit power control signal is maintained.

On the other hand, when it is determined at Step S51 that the power of the storage unit 112 is OFF (Step S51: Yes), the power control unit 115 outputs the storage unit power control signal indicating power-on to the storage unit 112 (Step S52). As a result, the storage unit 112 is turned on (Step S61).

Meanwhile, after Step S43, the input/output control unit 113 outputs a read request signal for the processing data based on the processing data identification information contained in the transmission request signal to the storage unit 112 (Step S44). The storage unit 112 reads the processing data indicated by the read request signal (Step S62), and outputs the processing data to the input/output control unit 113. Then, the input/output control unit 113 acquires the processing data (Step S45). When the input/output control unit 113 completes acquisition of the processing data from the storage unit 112, process control proceeds to Step S46.

At Step S46, the input/output control unit 113 determines whether a process set signal is contained in the transmission request signal received at Step S41. When it is determined that the process set signal is not contained in the transmission request signal (Step S46: No), process control proceeds to Step S48. On the other hand, at Step S46, when it is determined that the process set signal is contained in the transmission request signal (Step S46: Yes), the input/output control unit 113 extracts the process set signal (Step S47).

Then, the input/output control unit 113 adds identification information of the computing unit 11 serving as a destination to the processing data acquired at Step S45 and/or the process set signal extracted at Step S47, and sends the process set signal as an output signal to the computing unit 11 serving as the destination (Step S48). The input/output control unit 113 changes the state of the input/output status signal to the standby state (Step S49), and process control ends. When the input/output status signal is already in the standby state before performing processing at Step S49, the current state is maintained.

Meanwhile, the power control unit 115 monitors the state of the process status signal input from the process control unit 114 (not shown) (Step S53: No). When detecting that the process status signal is in the standby state (Step S53: Yes), the power control unit 115 outputs the processing unit power control signal indicating power-off to the processing unit 111 (Step S54). As a result, the processing unit 111 is turned off.

Then, the power control unit 115 monitors the state of the input/output status signal input from the input/output control unit 113 (Step S55: No). When detecting that the input/output status signal is in the standby state (Step S55: Yes), the power control unit 115 outputs the storage unit power control signal indicating power-off to the storage unit 112 (Step S56). As a result, the storage unit 112 is turned off (Step S63), and process control ends.

In the output signal transmission process shown in FIG. 7, whether the processing data identification information is contained in the transmission request signal is determined and thereafter whether the process set signal is contained in the transmission request signal is determined. However, an order of the processes is not limited to the above and can be changed with each other or the processes can be performed in parallel to each other. Furthermore, timings at which processes at Steps S53 to S56 are performed are not limited to those described in the example shown in FIG. 7 and can be arbitrary.

Next, an operation performed when the input/output control unit 113 outputs the process set signal to the process control unit 114 (an operation control process) is described with reference to FIG. 8.

Figure 8:
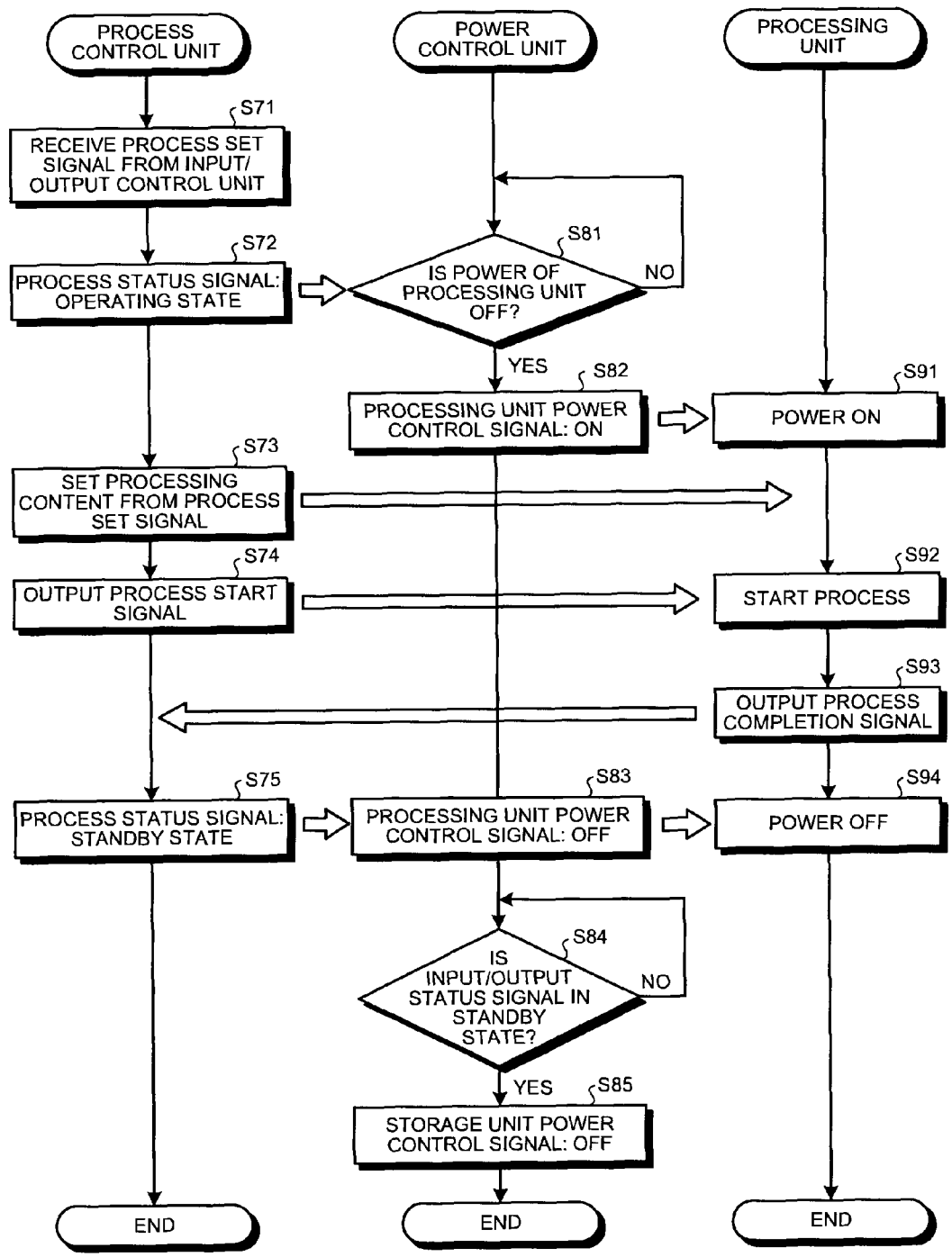
FIG. 8 is a flowchart of a procedure of an operation control process according to the first embodiment.

In FIG. 8, Steps S71 to S75 are processes performed by the process control unit 114, Steps S81 to S85 are processes performed by the power control unit 115, and Steps S91 to S94 are processes performed by the processing unit 111. Processes shown in FIG. 8 correspond to the process at Step S17 shown in FIG. 6.

The process control unit 114 receives input of the process set signal from the input/output control unit 113 (Step S71), and changes the state of the process status signal to the operating state (Step S72).

Meanwhile, upon detecting that the state of the process status signal is changed to the operating state, the power control unit 115 determines whether the power of the processing unit 111 is OFF by checking the state of the processing unit power control signal output from the power control unit 115 itself (Step S81). When it is determined that the power of the processing unit 111 is ON (Step S81: No), the current state of the processing unit power control signal is maintained.

On the other hand, when it is determined at Step S81 that the power of the processing unit 111 is OFF (Step S81: Yes), the power control unit 115 outputs the processing unit power control signal indicating power-on to the processing unit 111 (Step S82). As a result, the processing unit 111 is turned on (Step S91).

Meanwhile, after Step S72, the process control unit 114 performs setting of a process to the processing unit 111 depending on the processing content indicated by the process set signal (Step S73), and outputs the process start signal to the processing unit 111 (Step S74).

Upon receiving the process start signal output at Step S74, the processing unit 111 starts the process set at Step S73 (Step S92). When the process is completed, the processing unit 111 outputs the process completion signal to the process control unit 114 (Step S93).

Upon receiving input of the process completion signal from the processing unit 111, the process control unit 114 changes the state of the process status signal to the standby state (Step S75), and process control by the process control unit 114 ends.

Meanwhile, upon detecting that the state of the process status signal is changed to the standby state, the power control unit 115 outputs the processing unit power control signal indicating power-off to the processing unit 111 (Step S83). As a result, the processing unit 111 is turned off (Step S94). Then, the power control unit 115 waits until the input/output status signal is to be in the standby state (Step S84: No).

At Step S84, upon detecting that the state of the input/output status signal is changed to the standby state (Step S84: Yes), the power control unit 115 outputs the storage unit power control signal indicating power-off to the storage unit 112. As a result, the storage unit 112 is turned off (Step S85), and process control by the power control unit 115 ends.

As described above, according to the first embodiment, ON and OFF of the power of the processing unit 111 and the storage unit 112 can be controlled according to the states of the input/output control unit 113 and the process control unit 114. Therefore, power control can be independently performed for each of the computing units 11. Thus, power consumption of each of the computing units 11 can be reduced and thereby power management for overall system can be efficiently performed.

Furthermore, ON and OFF of the power of the processing unit 111 and the storage unit 112 can be controlled according to correspondence between the stat of the input/output status signal output from the input/output control unit 113 and the state of the process status signal output from the process control unit 114. Therefore, effective power management can be performed while functions of the computing unit 11 can be maintained.

A first modification of the firs embodiment is described below. In the first modification, an example is described in which a nonvolatile memory, a volatile memory, and a ROM (Read Only Memory) are provided as the storage unit 112. In the below description, the same reference numerals denote the same constituent elements described in the first embodiment, and therefore, the same explanation is not repeated.

Figure 9:
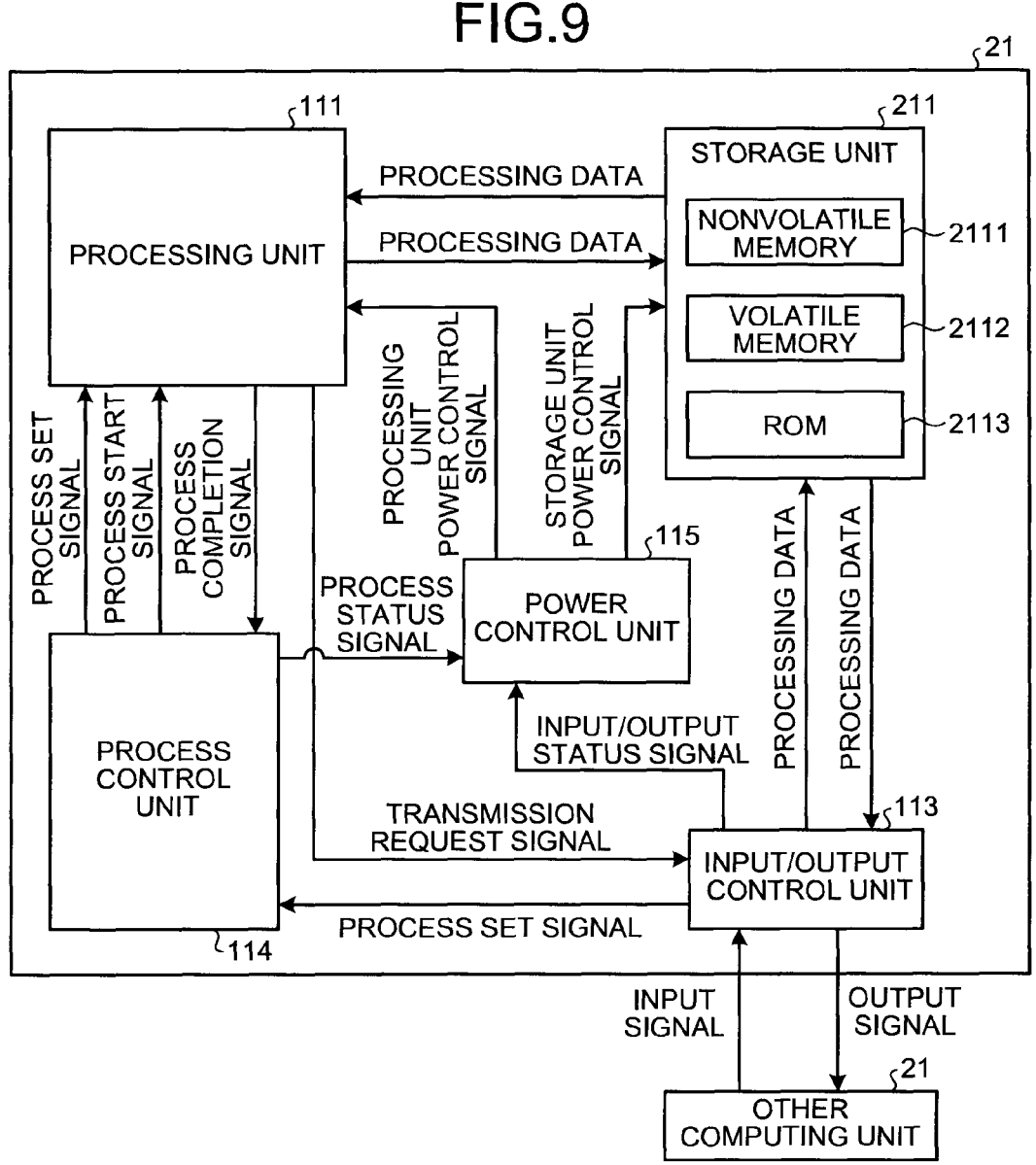
FIG. 9 is a diagram of a computing unit according to a first modification of the first embodiment.

FIG. 9 is a diagram of a configuration of a computing unit 21 according to the first modification of the first embodiment. The configuration of the system LSI on which the computing unit 21 is mounted is the same as that of the first embodiment, and therefore, the same explanation is not repeated. As shown in FIG. 9, the computing unit 21 includes the processing unit 111, a storage unit 211, the input/output control unit 113, the process control unit 114, and the power control unit 115.

The storage unit 211 includes a nonvolatile memory 2111, a volatile memory 2112, and a ROM 2113. The nonvolatile memory 2111 is a memory from which stored data is not deleted even when power is OFF. Examples of the nonvolatile memory 2111 include an MRAM, an FeRAM, a PRAM, and a Flash ROM. The volatile memory 2112 is a memory from which stored data is deleted when power is OFF. Examples of the volatile memory 2112 include an SRAM and a DRAM. In the configuration shown in FIG. 9, both the nonvolatile memory 2111 and the ROM 2113 are provided. However, the configuration including at least one of the nonvolatile memory 2111 and the ROM 2113 is applicable.

The nonvolatile memory 2111 or the ROM 2113 includes process related information about a process to be executed by the processing unit 111. Here, the "process related information" is a command or a parameter of a processor, encryption key for an encryption process, or the like. It is preferable to use information that is frequently used and not to be updated in a process performed by the processing unit 111 as the process related information. By using such information, it is not necessary to transfer data from the system memory 12 at the time of power-on. As a result, it is possible to speed up booting and reduce power consumption of the communication device (not shown).

Furthermore, it is preferable to store information that is frequently reused and to be updated (e.g., processing data that is encrypted and used in CBC mode for an encryption process such as ACS or DES) in the nonvolatile memory 2111. What memory region (the nonvolatile memory 2111 or the volatile memory 2112) is to be used as a storage destination of processing data is determined in a computer program to be executed or in the process set information. The processing unit 111 and the input/output control unit 113 store processing data in that predetermined memory region.

For allocating processes to each of the computing units 21, booting can be performed at high speed at the time of power-on of the computing unit 21 by using the nonvolatile memory 2111. Specifically, scheduling is performed so that the same process is allocated to the same computing unit 21, and a command or a parameter related to the process is stored in the nonvolatile memory 2111. Accordingly, it is not necessary to load the same information from the system memory 12 in the process at the second time or later. Therefore, the computing unit 21 can be booted at high speed and power consumption of a communication path or a system memory can be reduced.

Figure 10:
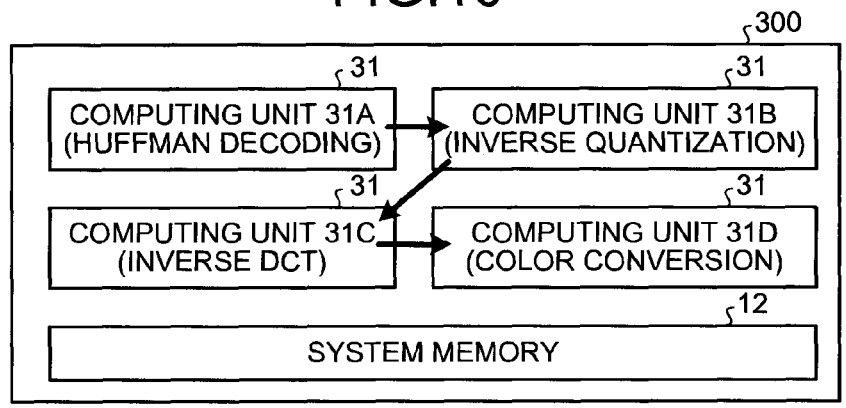
FIG. 10 is a diagram of a system LSI according to the first modification of the first embodiment.

In the below description, an example is used in which the configuration of the first modification of the first embodiment is applied to a system LSI 300 that performs a decoding process on a JPEG (Joint Photographic Experts Group) image. FIG. 10 is a diagram of the system LSI 300. As shown in FIG. 10, the system LSI 300 includes computing units 31 and the system memory 12.

In the decoding process on the JPEG image, a series of processes is repeated in units of data block called a macroblock. Specifically, decoding of the JPEG is performed by sequentially performing a Huffman decoding process, an inverse quantization process, an inverse DCT process, and a color conversion process in units of macroblock. Here, known techniques can be applied to processing content of each of the above processes. Furthermore, in addition to the decoding process on the JPEG image, multimedia operation such as a compression-expansion process on a still image, a moving image, or audio is performed by repeating a series of processes in units of data block as described above. Therefore, the first modification can be applied to the above processes or the like.

As shown in FIG. 10, the system LSI 300 includes the four computing units 31 (31A to 31D). It is assumed that the configuration of each of the computing units 31 is the same as that of the computing unit 21 described in the first modification of the first embodiment. However, the configuration can be the same as that of the computing unit 11 as described above.

Each of the computing units 31 is assigned to a single process for the decoding process on the JPEG image. Specifically, among the four computing units 31 (the computing units 31A to 31D), the computing unit 31A is assigned to the Huffman decoding process, the computing unit 31B is assigned to the inverse quantization process, the computing unit 31C is assigned to the inverse DCT process, and the computing unit 31D is assigned to the color conversion process. It is assumed that the processing unit 111 of the computing units 31 is a processor, and a command or a parameter for the process assigned to each of the computing units 31 is stored in advance in the nonvolatile memory 2111 or the ROM 2113 of the storage unit 211. Thus, it is not necessary to load the command or the parameter from the system memory 12 at the time of power-on of the storage unit 211. As a result, it is possible to reduce time necessary for starting a process.

At the initial state of the system LSI 300, power of the processing unit 111 and the storage unit 211 of each of the computing units 31 is OFF. Start of the process can be controlled by a control device (not shown) mounted on the system LSI 300 or a controller (not shown) provided outside of the system LSI 300. Upon starting the decoding process, the system LSI 300 inputs information about macroblock to the computing unit 31A from the system memory 12. Access to the system memory 12 can be established by sending a communication signal similar to communication between the computing units 31 or allocating as a shared memory among the computing units 31 on an address map. That is, any methods that allow the computing units 31 to access the system memory 12 can be used.

Upon receiving an input signal for the first macroblock from the system memory 12, the computing unit 31A turns on the processing unit 111 and the storage unit 211. Then, the computing unit 31A stores the first macroblock in the volatile memory 2112 of the storage unit 211 and outputs a process set signal for Huffman decoding to the process control unit 114. Upon acquiring the first macroblock, the processing unit 111 of the computing unit 31A performs the Huffman decoding process under control of the process control unit 114. When the processing unit 111 completes the Huffman decoding process, the input/output control unit 113 of the computing unit 31A sends an output signal containing a process set signal for inverse quantization and the macroblock that has been subjected to the Huffman decoding process to the computing unit 31B, and turns off the processing unit 111. Upon completing transmission of the output signal to the computing unit 31B, the computing unit 31A reads a next macroblock from the system memory 12 and performs the Huffman decoding process again.

Upon receiving an input signal of the macroblock from the computing unit 31A, the computing unit 31B turns on the processing unit 111 and the storage unit 211. Then, the computing unit 31B stores the first macroblock in the volatile memory 2112 of the storage unit 211 and outputs a process set signal for inverse quantization to the process control unit 114. Upon acquiring the first macroblock, the processing unit 111 of the computing unit 31B performs the inverse quantization process under control of the process control unit 114. When the processing unit 111 completes the inverse quantization process, the input/output control unit 113 of the computing unit 31B sends an output signal containing a process set signal for the inverse DCT and the macroblock that has been subjected to the inverse quantization process to the computing unit 31C, and turns off the processing unit 111. Upon completing transmission of the output signal to the computing unit 31C, the computing unit 31B turns off the storage unit 211 and waits reception of an input signal for a next macroblock.

Upon receiving an input signal of the macroblock from the computing unit 31B, the computing unit 31C turns on the processing unit 111 and the storage unit 211. Then, the computing unit 31C stores the first macroblock in the volatile memory 2112 of the storage unit 211 and outputs a process set signal for inverse DCT to the process control unit 114. Upon acquiring the first macroblock, the processing unit 111 of the computing unit 31C performs the inverse DCT process under control of the process control unit 114. When the processing unit 111 completes the inverse DCT process, the input/output control unit 113 of the computing unit 31C sends an output signal containing a process set signal for color conversion and the macroblock that has been subjected to the inverse DCT process to the computing unit 31D, and turns off the processing unit 111. Upon completing transmission of the output signal to the computing unit 31D, the computing unit 31C turns off the storage unit 211 and waits reception of an input signal for a next macroblock.

Upon receiving an input signal of the macroblock from the computing unit 31C, the computing unit 31D turns on the processing unit 111 and the storage unit 211. Then, the computing unit 31D stores the first macroblock in the volatile memory 2112 of the storage unit 211 and outputs a process set signal for the color conversion to the process control unit 114. Upon acquiring the first macroblock, the processing unit 111 of the computing unit 31D performs the color conversion process under control of the process control unit 114. When the processing unit 111 completes the color conversion process, the input/output control unit 113 of the computing unit 31D writes an output signal containing the macroblock that has been subjected to the color conversion process to the system memory 12, and turns off the processing unit 111. Upon completing writing to the system memory 12, the computing unit 31D turns off the storage unit 211 and waits reception of an input signal for a next macroblock.

Figure 11:
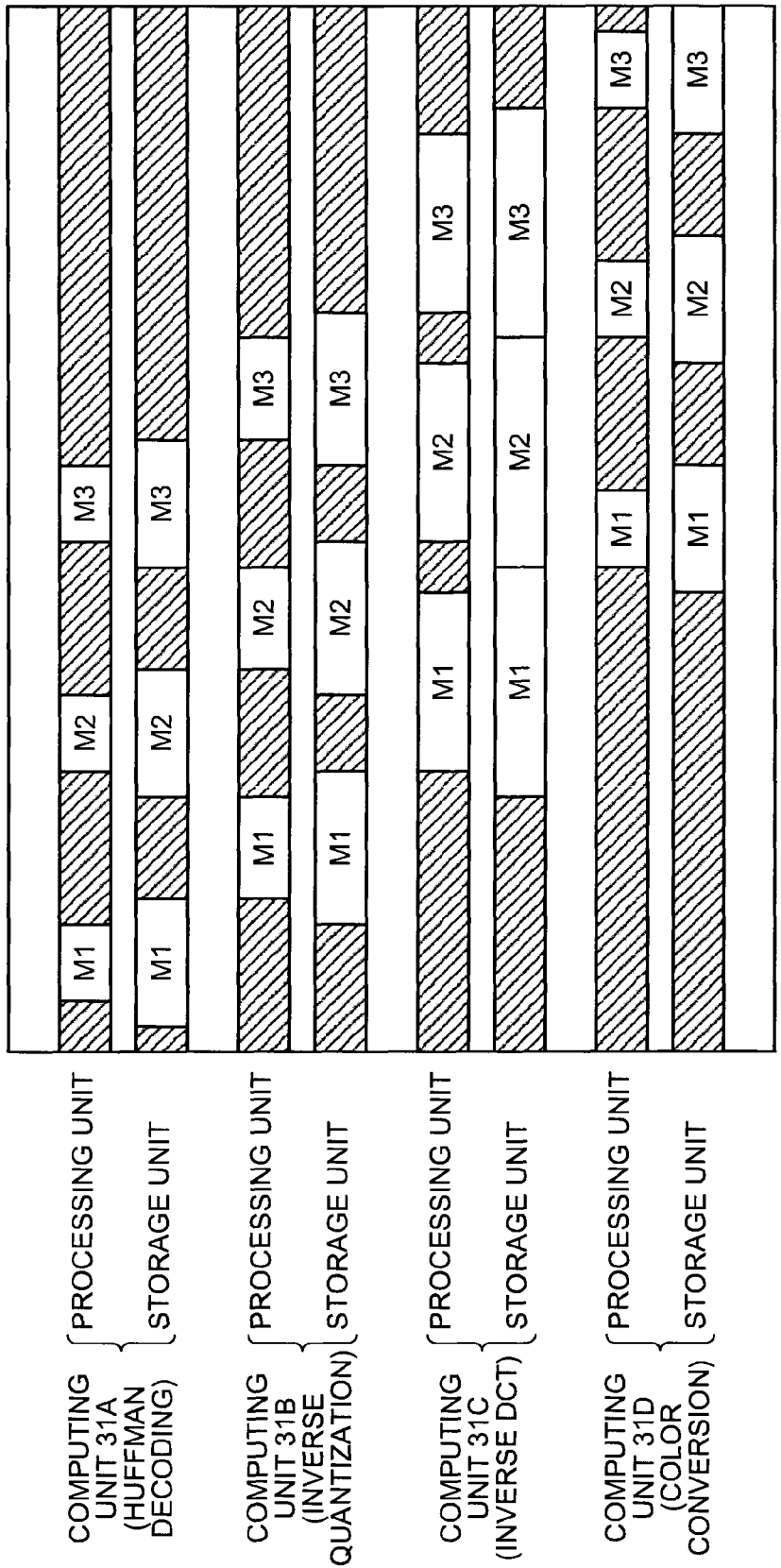
FIG. 11 is a timing diagram illustrating a power ON/OFF state of a processing unit and a storage unit in a computing unit shown in FIG. 10.

FIG. 11 is a timing diagram illustrating a power ON/OFF state of the processing unit 111 and the storage unit 211 in each of the computing units 31. In FIG. 11, shaded areas represent periods in which power is OFF, and areas indicated by reference symbols M1 to M3 represent periods in which power is ON for macroblocks M1 to M3, respectively.

As shown in FIG. 11, the power of the processing unit 111 and the storage unit 211 can be controlled independently for each computing unit. Therefore, when only communication is performed, the processing unit 111 can be turned off. Thus, power consumption of the entire system LSI 300 can be effectively reduced.

Next, a system LSI according to a second embodiment of the present invention is described below. The same reference numerals denote the same constituent elements described in the first embodiment, and therefore, the same explanation is not repeated.

Figure 12:
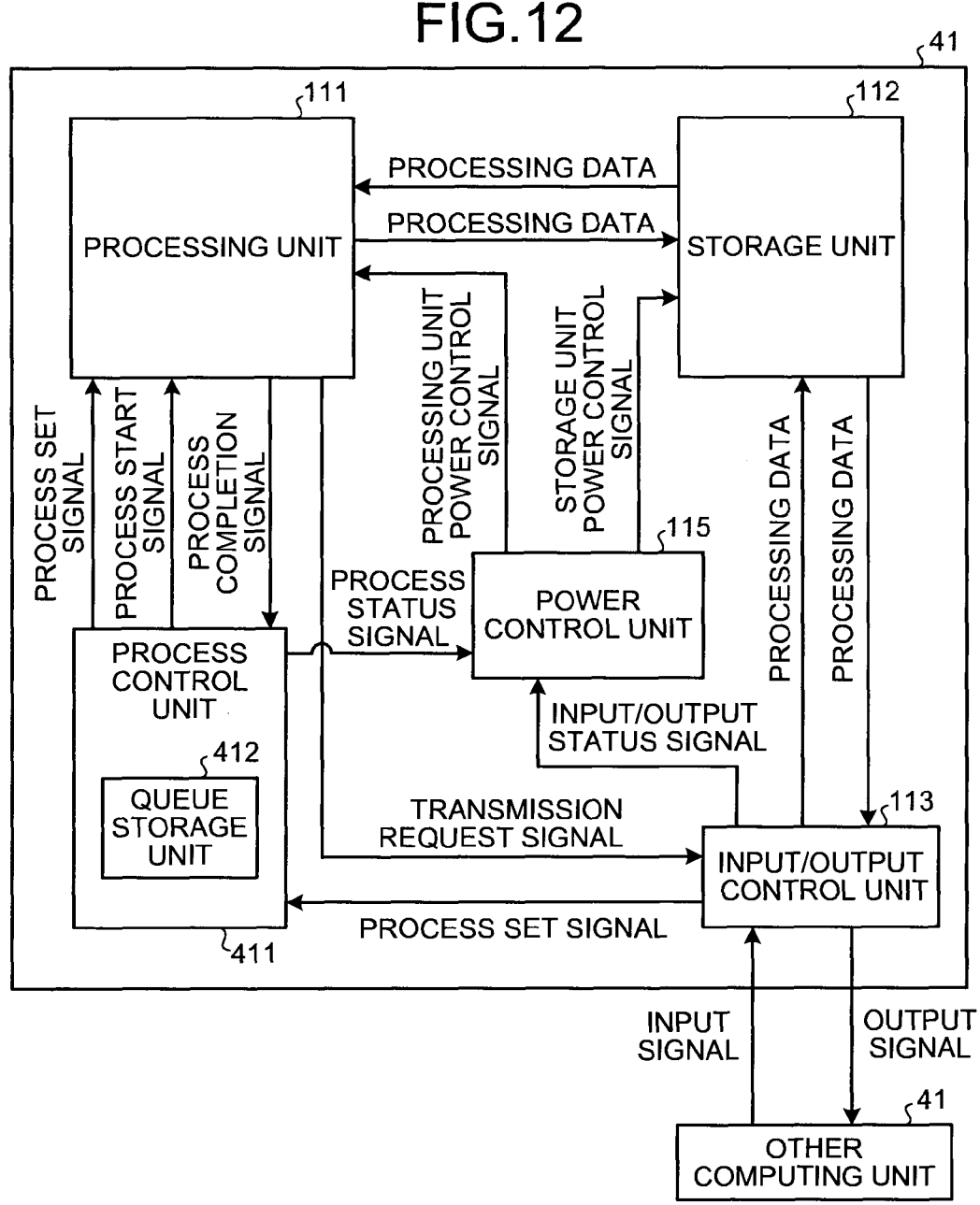
FIG. 12 is a diagram of a computing unit according to a second embodiment of the present invention.

FIG. 12 is a diagram of a computing unit 41 according to the second embodiment. The configuration of the system LSI on which the computing unit 41 is mounted is the same as that of the first embodiment, and therefore, the same explanation is not repeated. As shown in FIG. 12, the computing unit 41 includes the processing unit 111, the storage unit 112, the input/output control unit 113, a process control unit 411, and the power control unit 115.

The process control unit 411 basically has the same functions as those of the process control unit 114 as described above. As the difference from the process control unit 114, the process control unit 411 includes a queue storage unit 412 that stores therein a process set signal. The queue storage unit 412 serves as a queue memory for storing therein queues in FIFO order or priority queues, and sequentially stores therein the process set signal input from the input/output control unit 113 under control of the process control unit 411.

When the process set signal is input from the input/output control unit 113 while the processing unit 111 is operating, the process control unit 411 sequentially stores the process set signal in the queue storage unit 412. If the process set signal cannot be stored in the queue storage unit 412 because of capacity shortage, the process control unit 411 waits until the queue storage unit 412 can store therein the process set signal. At this state, the input/output control unit 113 can continue outputting the process set signal to the process control unit 411 or can suspend outputting and outputs again after a predetermined time has elapsed.

Furthermore, when the process completion signal is input from the processing unit 111, the process control unit 411 sequentially reads the process set signal from the queue storage unit 412, performs setting of the process to the processing unit 111 according to the process set signal, and outputs the process start signal to the processing unit 111. At this state, the process control unit 411 deletes the process set signal whose setting is completed from the queue storage unit 412.

Moreover, when confirming that the queue storage unit 412 does not store therein the process set signal after the process completion signal has been input from the processing unit 111, the process control unit 411 changes the state of the process status signal indicating the state of own unit to the standby state. State transition of the process control unit 411 is described below with reference to FIG. 13.

Figure 13:
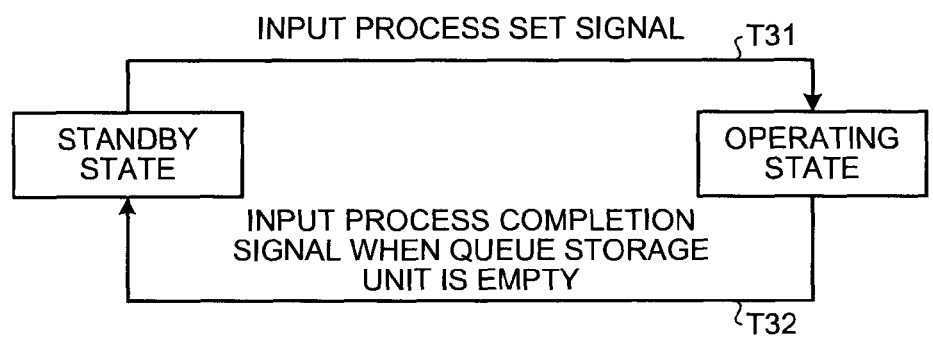
FIG. 13 is a diagram for explaining state transition of a process control unit shown in FIG. 12.

FIG. 13 is a schematic diagram illustrating state transition of the process control unit 411. It is assumed that a process status signal to be output when the process control unit 411 is in an initial state, that is, when a process set signal and a process completion signal are not input, indicates "standby". Hereinafter, a state of the process status signal indicating "standby" is refereed to as a standby state and a state of the process status signal indicating "operating" is refereed to as an operating state.

As shown in FIG. 13, when receiving input of the process set signal from the input/output control unit 113 while the process status signal is in the standby state, the process control unit 411 changes the state of the process status signal from the standby state to the operating state (T31 in FIG. 13). Furthermore, when the process completion signal is input from the processing unit 111 during the operating state and the queue storage unit 412 is empty, the process control unit 411 changes the state of own unit from the operating state to the standby state (T32 in FIG. 13). That is, because access to the processing unit 111 is promptly required when the process set signal is accumulated in the queue storage unit 412, the process control unit 411 changes the state of the input/output status signal to the standby state only after confirming that the queue storage unit 412 is empty.

An operation by the computing unit 41 according to the second embodiment is described below with reference to FIG. 14. The operations at the input signal reception process and the output signal transmission process are the same as those of the first embodiment, and therefore, the same explanation is not repeated.

Figure 14:
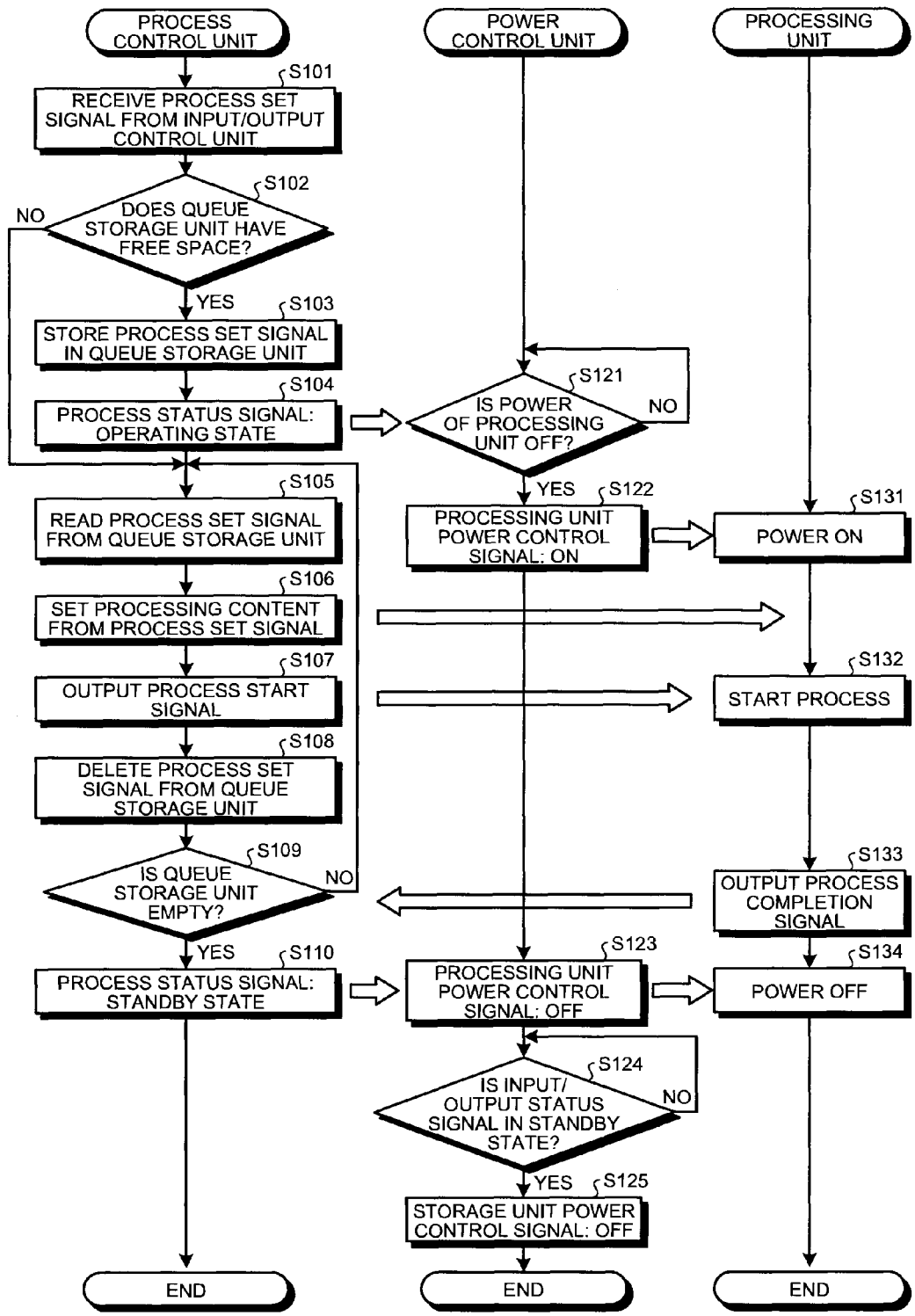
FIG. 14 is a flowchart of a procedure of an operation control process according to the second embodiment.

FIG. 14 is a flowchart of a procedure of an operation control process. In FIG. 14, Steps S101 to S110 are processes performed by the process control unit 411, Steps S121 to S125 are processes performed by the power control unit 115, and Steps S131 to S134 are processes performed by the processing unit 111. Processes shown in FIG. 14 correspond to the process at Step S17 shown in FIG. 6.

The process control unit 411 receives input of the process set signal from the input/output control unit 113 (Step S101), and determines whether the process set signal can be stored in the queue storage unit 412 (Step S102). When it is determined that the process set signal cannot be stored in the queue storage unit 412 (Step S102: No), the process control unit 411 outputs a signal for rejecting the input process set signal (a reject signal) to the input/output control unit 113, and process control proceeds to Step S105. When receiving the reject signal, the input/output control unit 113 re-inputs the same process set signal to the process control unit 411 after a predetermined time has elapsed.

At Step S102, when it is determined that the process set signal can be stored in the queue storage unit 412 (Step S102: Yes), the process control unit 411 stores the input process set signal in the queue storage unit 412 (Step S103), and changes the state of the process status signal to the operating state (Step S104).

Meanwhile, upon detecting that the state of the process status signal is changed to the operating state, the power control unit 115 determines whether the power of the processing unit 111 is OFF by checking the state of the processing unit power control signal output from the power control unit 115 itself (Step S121). When it is determined that the power of the processing unit 111 is ON (Step S121: No), the current state of the processing unit power control signal is maintained.

On the other hand, when it is determined at Step S121 that the power of the processing unit 111 is OFF (Step S121: Yes), the power control unit 115 outputs the processing unit power control signal indicating power-on to the processing unit 111 (Step S122). As a result, the processing unit 111 is turned on (Step S131).

Meanwhile, after Step S104, the process control unit 411 reads the process set signal from the queue storage unit 412 (Step S105), performs setting of a process corresponding to the process set signal to the processing unit 111 (Step S106), and outputs the process start signal to the processing unit 111 (Step S107). Then, the process control unit 411 deletes the process set signal read at Step S105 from the queue storage unit 412 (Step S108).

Upon receiving the process start signal output at Step S107, the processing unit 111 starts the process set at Step S106 (Step S132). When the process is completed, the processing unit 111 outputs the process completion signal to the process control unit 411 (Step S133).

Meanwhile, upon receiving input of the process completion signal from the processing unit 111, the process control unit 411 determines whether the queue storage unit 412 is empty (Step S109). When it is determined that the process set signal is stored (Step S109: No), the process control unit 411 returns to the process at Step S105 and reads a next process set signal from the queue storage unit 412.

When it is determined at Step S109 that the queue storage unit 412 is empty (Step S109: Yes), the process control unit 411 changes the state of the process status signal to the standby state (Step S110), and process control by the process control unit 411 ends.

Meanwhile, upon detecting that the state of the process status signal is changed to the standby state, the power control unit 115 outputs the processing unit power control signal indicating power-off to the processing unit 111 (Step S123). As a result, the processing unit 111 is turned off (Step S134). Then, the power control unit 115 waits until the input/output status signal is to be in the standby state (Step S124: No).

Upon detecting that the state of the input/output status signal is the standby state (Step S124: Yes), the power control unit 115 outputs the storage unit power control signal indicating power-off to the storage unit 112. As a result, the storage unit 112 is turned off (Step S125), and process control by the power control unit 115 ends.

As described above, according to the second embodiment, ON and OFF of the power of the processing unit 111 and the storage unit 112 can be controlled according to the states of the input/output control unit 113 and the process control unit 411. Therefore, power control can be independently performed for each of the computing units 41. Thus, power consumption of each of the computing units 41 can be reduced and thereby power management for overall system can be efficiently performed.

Furthermore, the process control unit 411 is caused to continuously operate in a power-on state until the process set information accumulated in the queue storage unit 412 is deleted. Therefore, power control on the process control unit 411 can be effectively performed and processes performed by the processing unit 111 can be facilitated.

Next, a system LSI according to a third embodiment of the present invention is described below. The same reference numerals denote the same constituent elements described in the first embodiment, and therefore, the same explanation is not repeated.

Figure 15:
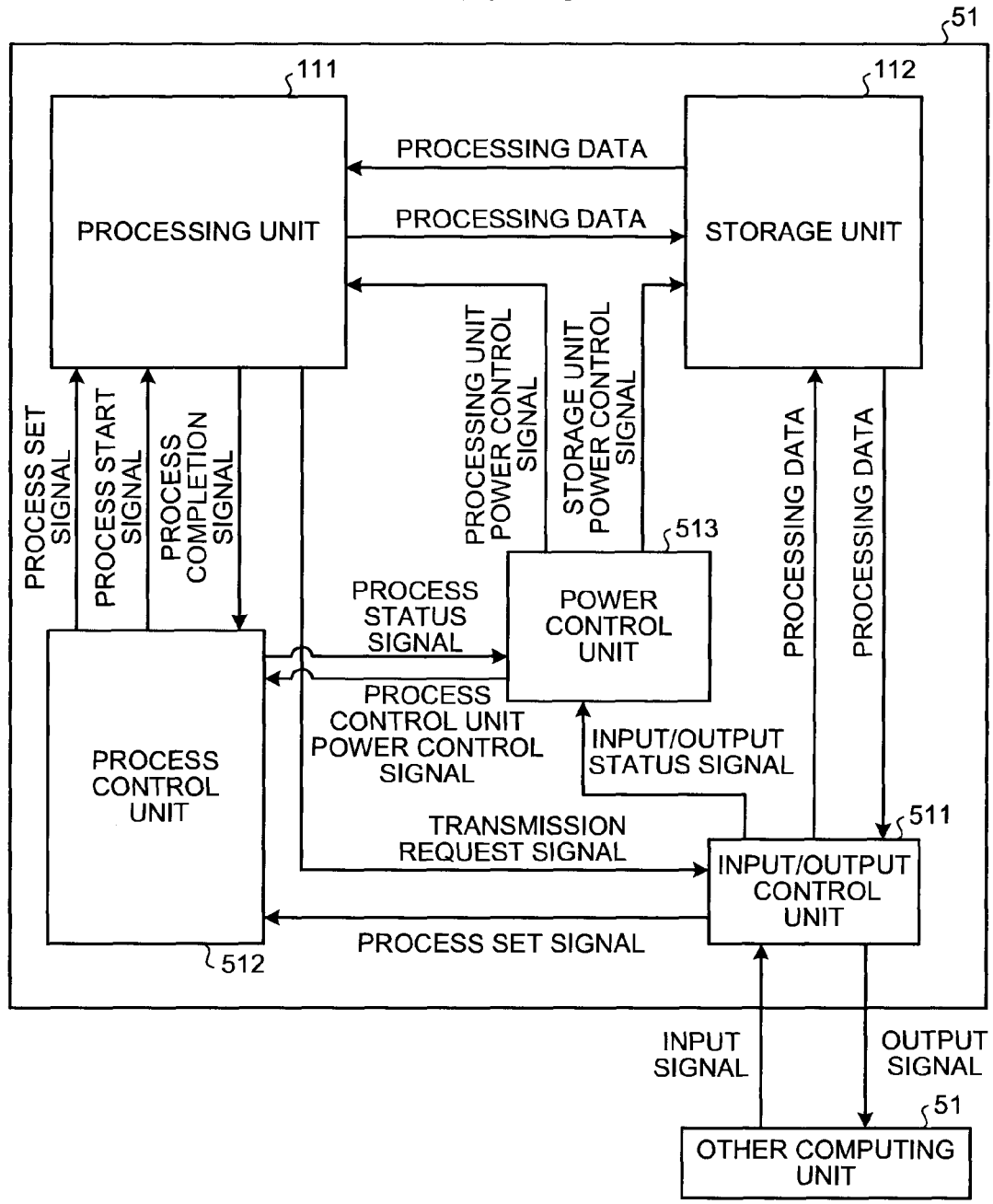
FIG. 15 is a diagram of a computing unit according to a third embodiment of the present invention.

FIG. 15 is a diagram of a computing unit 51 according to the third embodiment. The configuration of the system LSI on which the computing unit 51 is mounted is the same as that of the first embodiment, and therefore, the same explanation is not repeated. As shown in FIG. 15, the computing unit 51 includes the processing unit 111, the storage unit 112, an input/output control unit 511, a process control unit 512, and a power control unit 513.

The input/output control unit 511 basically has the same functions as those of the input/output control unit 113 as described above. The difference from the input/output control unit 113 is that the input/output control unit 511 notifies, when a received input signal contains a process set signal, the power control unit 513 of reception of the process set signal by using the input/output status signal.

The process control unit 512 basically has the same functions as those of the process control unit 114 as described above. As the difference from the process control unit 114, the process control unit 512 turns on and off of the power of own unit according to the state of a process control unit power control signal input from the power control unit 513.

The power control unit 513 basically has the same functions as those of the power control unit 115 as described above. The difference from the power control unit 115 is that, when detecting that the process status signal input from the process control unit 512 is in the standby state, the power control unit 513 outputs the process control unit power control signal indicating power-off to the process control unit 512 to turn off the power of the process control unit 512.

Upon detecting that the input/output control unit 511 has received the process set signal based on an input/output status signal input from the input from the input/output control unit 511, the power control unit 513 outputs the process control unit power control signal indicating power-on to the process control unit 512 to turn on the power of the process control unit 512.

An operation by the computing unit 51 according to the third embodiment is described below. The operations at the operation control process are the same as those of the first embodiment, and therefore, the same explanation is not repeated.

Figure 16:
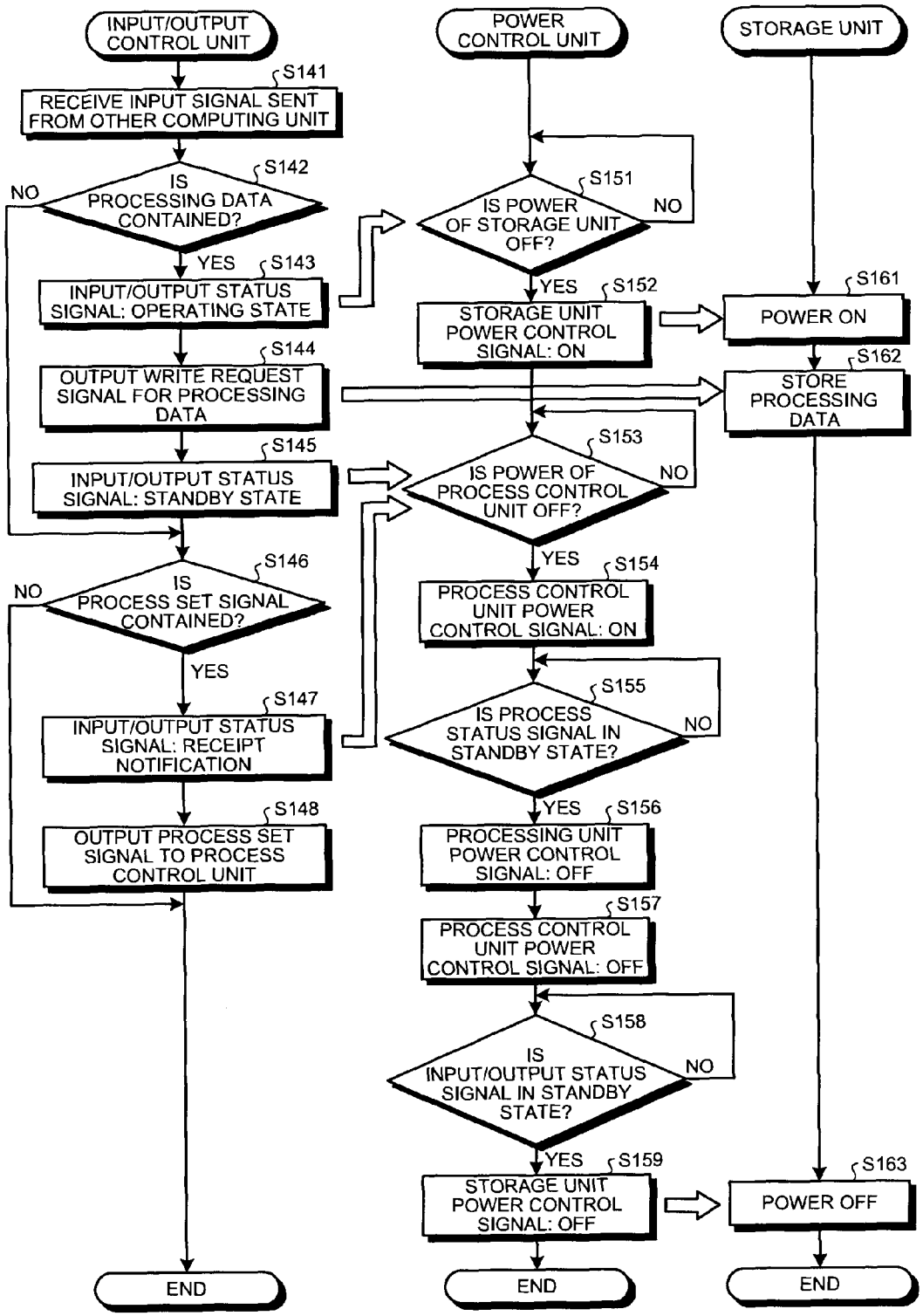
FIG. 16 is a flowchart of a procedure of an input signal reception process according to the third embodiment.

An input signal reception process according to the third embodiment is described below with reference to FIG. 16. In FIG. 16, Steps S141 to S148 are processes performed by the input/output control unit 511, Steps S151 to S159 are processes performed by the power control unit 513, and Steps S161 to S163 are processes performed by the storage unit 112.

The input/output control unit 511 receives an output signal sent from the other ones of the computing units 51 as an input signal to the computing unit 51 of own unit (Step S141), and determines whether the input signal contains processing data (Step S142). When it is determined that the input signal does not contain the processing data (Step S142: No), process control directly proceeds to Step S145.

When it is determined at Step S142 that the input signal contains the processing data (Step S142: Yes), the input/output control unit 511 changes the state of the input/output status signal to the operating state (Step S143).

Meanwhile, upon detecting that the state of the input/output status signal is changed to the operating state, the power control unit 513 determines whether the power of the storage unit 112 is OFF by checking the state of the storage unit power control signal output from the power control unit 513 itself (Step S151). When it is determined that the power of the storage unit 112 is ON (Step S151: No), the current state of the storage unit power control signal is maintained.

On the other hand, when it is determined at Step S151 that the power of the storage unit 112 is OFF (Step S151: Yes), the power control unit 513 outputs the storage unit power control signal indicating power-on to the storage unit 112 (Step S152). As a result, the storage unit 112 is turned on (Step S161).

Meanwhile, after Step S143, the input/output control unit 511 outputs a write request signal for the processing data contained in the input signal to the storage unit 112 (Step S144). The storage unit 112 stores therein the processing data according to the write request signal (Step S162). Then, upon completing writing of the processing data to the storage unit 112, the input/output control unit 511 changes the state of the input/output status signal to the standby state (Step S145), and process control proceeds to Step S146.

At Step S146, the input/output control unit 511 determines whether a process set signal is contained in the input signal received at Step S141. When it is determined that the process set signal is not contained in the input signal (Step S146: No), process control by the input/output control unit 511 ends. On the other hand, at Step S146, when it is determined that the process set signal is contained in the input signal (Step S146: Yes), the input/output control unit 511 notifies the power control unit 513 of reception of the process set signal by using the input/output status signal (Step S147). The input/output control unit 511 outputs the process set signal contained in the input signal to the process control unit 512 (Step S147), and then process control by the input/output control unit 511 ends.

Meanwhile, upon detecting that the input/output control unit 511 has received the process set signal from the input/output status signal, the power control unit 513 determines whether the power of the process control unit 512 is OFF by checking the state of the process control unit power control signal output from the power control unit 513 itself (Step S153). When it is determined that the power of the process control unit 512 is ON (Step S153: No), the current state of the process control unit power control signal is maintained.

On the other hand, at Step S153, when it is determined that the power of the process control unit 512 is OFF (Step S153: Yes), the power control unit 513 outputs the process control unit power control signal indicating power-on to the process control unit 512 (Step S154). As a result, the process control unit 512 is turned on.

The power control unit 513 monitors the state of the process status signal input from the process control unit 512 (not shown) (Step S155: No). When detecting that the process status signal is in the standby state (Step S155: Yes), the power control unit 513 outputs the processing unit power control signal indicating power-off to the processing unit 111 (Step S156), and outputs the process control unit power control signal indicating power-off to the process control unit 512 (Step S157). As a result, the processing unit 111 and the process control unit 512 are turned off.

Then, the power control unit 513 monitors the state of the input/output status signal input from the input/output control unit 511 (Step S158: No). When detecting that the input/output status signal is in the standby state (Step S158: Yes), the power control unit 513 outputs the storage unit power control signal indicating power-off to the storage unit 112 (Step S159). As a result, the storage unit 112 is turned off (Step S163), and process control ends.

In the input signal reception process shown in FIG. 16, whether the processing data is contained in the input signal is determined and thereafter whether the process set signal is contained in the input signal is determined. However, an order of the processes is not limited to the above and can be changed with each other or the processes can be performed in parallel to each other. Furthermore, timings at which processes at Steps S155 to S158 are performed are not limited to those described in the example shown in FIG. 16 and can be arbitrary.

Figure 17:
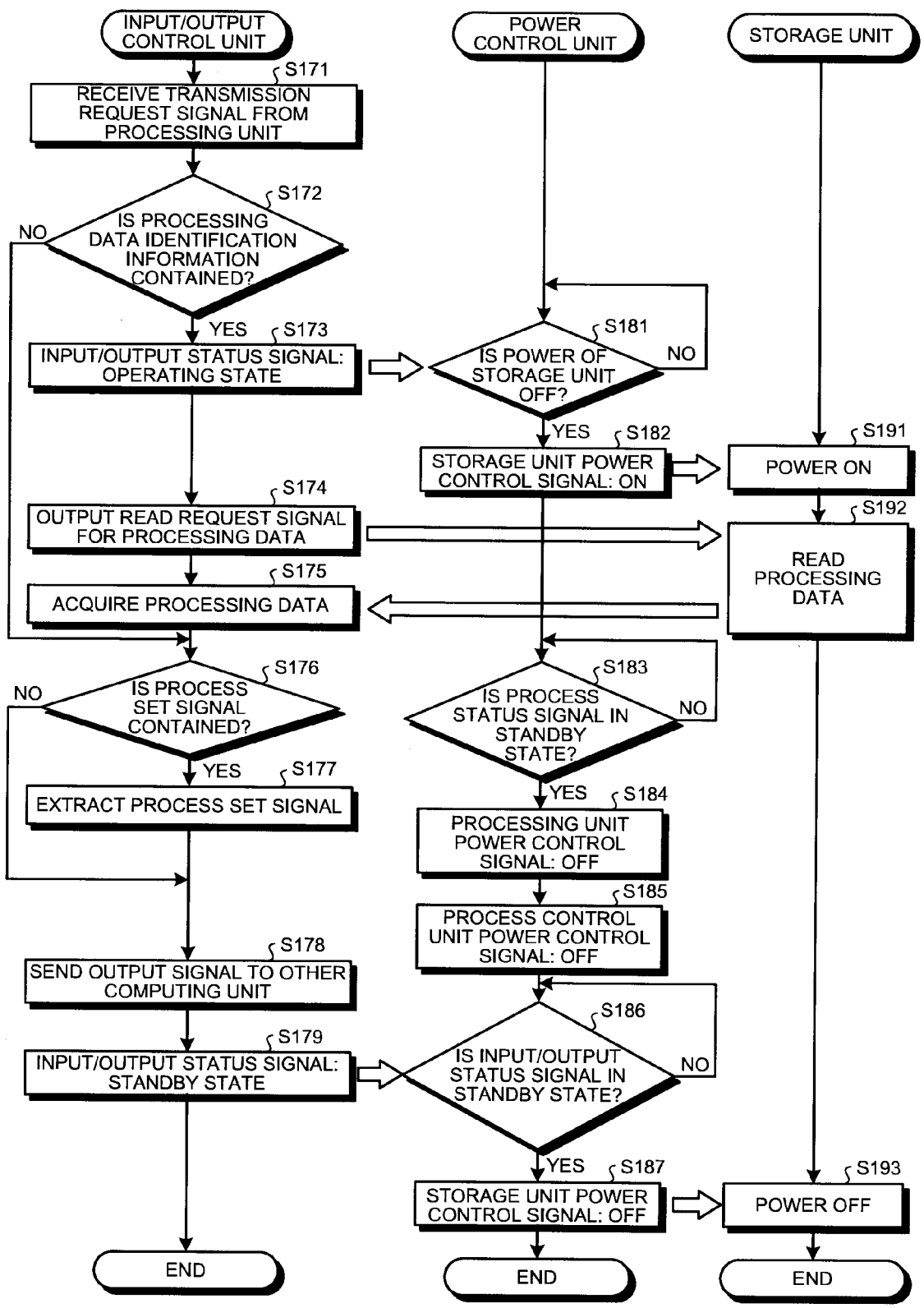
FIG. 17 is a flowchart of a procedure of an output signal transmission process according to the third embodiment.

Next, an output signal transmission process according to the third embodiment is described with reference to FIG. 17. In FIG. 17, Steps S171 to S179 are processes performed by the input/output control unit 511, Steps S181 to S187 are processes performed by the power control unit 513, and Steps S191 to S193 are processes performed by the storage unit 112.

The input/output control unit 511 receives input of a transmission request signal from the processing unit 111 (Step S171), and determines whether the transmission request signal contains processing data identification information (Step S172). When it is determined that the transmission request signal does not contain the processing data identification information (Step S172: No), process control directly proceeds to Step S176.

When it is determined at Step S172 that the transmission request signal contains the processing data identification information (Step S172: Yes), the input/output control unit 511 changes the state of the input/output status signal to the operating state (Step S173).

Meanwhile, upon detecting that the state of the input/output status signal is changed to the operating state, the power control unit 513 determines whether the power of the storage unit 112 is OFF by checking the state of the storage unit power control signal output from the power control unit 513 itself (Step S181). When it is determined that the power of the storage unit 112 is ON (Step S181: No), the current state of the storage unit power control signal is maintained.

On the other hand, when it is determined at Step S181 that the power of the storage unit 112 is OFF (Step S181: Yes), the power control unit 513 outputs the storage unit power control signal indicating power-on to the storage unit 112 (Step S182). As a result, the storage unit 112 is turned on (Step S191).

Meanwhile, after Step S173, the input/output control unit 511 outputs a read request signal for the processing data based on the processing data identification information contained in the transmission request signal to the storage unit 112 (Step S174). The storage unit 112 reads the processing data indicated by the read request signal (Step S192), and outputs the processing data to the input/output control unit 511. Then, the input/output control unit 511 acquires the processing data (Step S175).

Then, the input/output control unit 511 determines whether a process set signal is contained in the transmission request signal received at Step S171. When it is determined that the process set signal is not contained in the transmission request signal (Step S176: No), process control proceeds to Step S178. On the other hand, at Step S176, when it is determined that the process set signal is contained in the transmission request signal (Step S176: Yes), the input/output control unit 511 extracts the process set signal from the transmission request signal (Step S177), and process control proceeds to Step S178.

Then, the input/output control unit 511 adds identification information of the computing unit 51 serving as a destination to the processing data acquired at Step S175 and/or the process set signal extracted at Step S177, and sends the process set signal as an output signal to the computing unit 51 serving as the destination (Step S178). The input/output control unit 511 changes the state of the input/output status signal to the standby state (Step S179), and process control ends.

Meanwhile, the power control unit 513 monitors the state of the process status signal input from the process control unit 512 (not shown) (Step S183: No). When detecting that the process status signal is in the standby state (Step S183: Yes), the power control unit 513 outputs the processing unit power control signal indicating power-off to the processing unit 111 (Step S184), and outputs the process control unit power control signal indicating power-off to the process control unit 512 (Step S185). As a result, the processing unit 111 and the process control unit 512 are turned off.

Then, the power control unit 513 monitors the state of the input/output status signal input from the input/output control unit 511 (Step S186: No). When detecting that the input/output status signal is in the standby state (Step S186: Yes), the power control unit 513 outputs the storage unit power control signal indicating power-off to the storage unit 112 (Step S187). As a result, the storage unit 112 is turned off (Step S183), and process control ends.

In the output signal transmission process shown in FIG. 17, whether the processing data identification information is contained in the transmission request signal is determined and thereafter whether the process set signal is contained in the transmission request signal is determined. However, an order of the processes is not limited to the above and can be changed with each other or the processes can be performed in parallel to each other. Furthermore, timings at which processes at Steps S183 to S187 are performed are not limited to those described in the example shown in FIG. 17 and can be arbitrary.

As described above, according to the third embodiment, ON and OFF of the power of the processing unit 111 and the storage unit 112 can be controlled according to the states of the input/output control unit 511 and the process control unit 512. Therefore, power control can be independently performed for each of the computing units 51. Thus, power consumption of each of the computing units 51 can be reduced and thereby power management for overall system can be efficiently performed.

Furthermore, when the process control unit 512 is in the standby state, the power of the process control unit 512 is turned off. Therefore, power consumption of each of the computing units 51 can be further reduced and power control can be more efficiently performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit comprising:
a plurality of computing units, wherein each of the computing units includes
an input/output control unit that controls input and output of a process set signal, the process set signal being sent to and from the other computing units and indicating processing data and processing content of the processing data;
a storage unit that stores the processing data and processing content of the processing data;
a first signal output unit that outputs a first status signal indicating either one of an operating state and a standby state, the operating state indicating a state of the input/output control unit being to access the storage unit, and the standby state indicating a state of the input/output control unit being in other than the operating state;
a processing unit that performs a predetermined process, that the process set signal indicates, on processing data stored in the storage unit, stores the processing data that has been processed in the storage unit, and outputs identification information for identifying the processing data that has been processed from the storage unit and the process set signal indicating processing content to be performed by the other computing units;
a process control unit that controls a process performed by the processing unit based on the process set signal;
a second signal output unit that outputs a second status signal indicating either one of an operating state and a standby state, the operating state indicating a state of the process control unit being to control the processing unit, and the standby state indicating a state of the control unit being in other than the operating state; and
a power control unit that controls ON and OFF of power of the storage unit and the processing unit based on states of the first status signal and the second status signal.

2. The circuit according to claim 1, wherein the power control unit turns on the storage unit when the first status signal is in the operating state, and the power control unit turns on the storage unit and the processing unit when the second status signal is in the operating state.

3. The circuit according to claim 1, wherein the power control unit turns off the processing unit when the second status signal is in the standby state, and the power control unit turns off the storage unit when the first status signal and the second status signal are in the standby states.

4. The circuit according to claim 1, wherein
the first signal output unit changes the first status signal to be in the operating state either, when the input/output control unit receives input of the processing data from the other computing units or when the input/output control unit receives input of the identification information from the processing unit, and
the second signal output unit changes the second status signal to be in the operating state when the process control unit receives input of the process set signal from the input/output control unit.

5. The circuit according to claim 1, wherein
the first signal output unit changes the first status signal to be in the standby state either, when input of the processing data from the other computing units to the input/output control unit is completed or when the input/output control unit sends processing data identified by the identification information to the other computing units, and
the second signal output unit changes the second status signal to be in the standby state when the process control unit detects completion of a process performed by the processing unit.

6. The circuit according to claim 5, wherein
the processing unit outputs a process completion signal indicating completion of a process to the process control unit, and
the process control unit detects completion of a process performed by the processing unit based on an input of the process completion signal.

7. The circuit according to claim 1, further comprising a queue storage unit that sequentially stores a process set signal input from the input/output control unit to the process control unit, wherein the process control unit sequentially reads a process set signal stored in the queue storage unit and controls a process performed by the processing unit based on the process set signal.

8. The circuit according to claim 7, wherein
the first signal output unit changes the first status signal to be in the standby state either, when input of the processing data from the other computing units to the input/output control unit is completed or when the input/output control unit sends processing data identified by the identification information to the other computing units,
the second signal output unit changes the second status signal to be in the standby state, when the process control unit detects completion of a process performed by the processing unit and no process set signal is stored in the queue storage unit, and
the power control unit turns off the processing unit when the second status signal is in the standby state, and turns off the storage unit only when the first status signal and the second status signal are in the standby states.

9. The circuit according to claim 8, wherein
the processing unit outputs a process completion signal indicating completion of a process to the process control unit, and
the process control unit detects completion of a process performed by the processing unit based on an input of the process completion signal.

10. The circuit according to claim 1, wherein
the first signal output unit outputs the first status signal indicating that the input/output control unit has received a process set signal from the other computing units, and
the power control unit turns on the process control unit when the first status signal indicates input of a process set signal, and turns off the process control unit when the second status signal is in the standby state.

11. The circuit according to claim 1, wherein the storage unit includes any one of a nonvolatile memory and a ROM or both, and a volatile memory, wherein information about a process to be performed by the processing unit is stored in any one of the nonvolatile memory and the ROM or both.

12. A power control method implemented in each of computing units in a semiconductor integrated circuit that provides a plurality of computing units, the method comprising:
controlling input and output of a process set signal, the process set signal being sent to and from the other computing units and indicating processing data and processing content of the processing data, by an input/output control unit;
storing processing data and processing content of the processing data in a storage unit;
first outputting a first status signal indicating either one of an operating state and a standby state by a first signal output unit, the operating state indicating a state of the input/output control unit being to access the storage unit, and the standby state indicating a state of the input/output control unit being in other than the operating state;
performing a predetermined process, that the process set signal indicates, on processing data stored in the storage unit by a processing unit, storing the processing data that has been processed in the storage unit, and outputting identification information for identifying the processing data that has been processed from the storage unit and the process set signal indicating processing content to be performed by the other computing units;
controlling a process performed by the processing unit based on the process set signal;
second outputting a second status signal indicating either one of an operating state and a standby state by a second signal output unit, the operating state indicating a state of the process control unit being to control the processing unit, and the standby state indicating a state of the control unit being in other than the operating state; and
controlling ON and OFF of power of the storage unit and the processing unit by a power control unit based on states of the first status signal and the second status signal.

* * * * *